United States Patent
Tomioka et al.

(10) Patent No.: US 10,370,506 B2
(45) Date of Patent: *Aug. 6, 2019

(54) CARBON FIBER THERMOPLASTIC RESIN PREPREG, CARBON FIBER COMPOSITE MATERIAL AND PRODUCING METHOD

(71) Applicant: MITSUBISHI CHEMICAL CORPORATION, Chiyoda-ku (JP)

(72) Inventors: Masao Tomioka, Toyohashi (JP); Takahiro Hayashi, Toyohashi (JP); Saki Fujita, Toyohashi (JP); Takeshi Ishikawa, Toyohashi (JP); Keigo Yoshida, Toyohashi (JP); Takuya Teranishi, Toyohashi (JP); Atsushi Takahashi, Toyohashi (JP); Kenichi Watanabe, Toyohashi (JP); Morio Katagiri, Toyohashi (JP); Akinobu Sasaki, Toyohashi (JP); Masahiro Oosuka, Toyohashi (JP); Hiroshi Tategaki, Toyohashi (JP); Takayuki Kobayashi, Toyohashi (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,008

(22) PCT Filed: Mar. 29, 2013

(86) PCT No.: PCT/JP2013/059736
§ 371 (c)(1),
(2) Date: Sep. 22, 2014

(87) PCT Pub. No.: WO2013/147257
PCT Pub. Date: Oct. 3, 2013

(65) Prior Publication Data
US 2015/0044470 A1    Feb. 12, 2015

Related U.S. Application Data

(63) Continuation of application No. PCT/JP2013/059736, filed on Mar. 29, 2013.

(30) Foreign Application Priority Data

Mar. 29, 2012 (JP) .................... 2012-075986

(51) Int. Cl.
*B29C 70/50* (2006.01)
*C08J 5/04* (2006.01)
(Continued)

(52) U.S. Cl.
CPC .............. *C08J 5/042* (2013.01); *B29B 11/16* (2013.01); *B29C 70/504* (2013.01);
(Continued)

(58) Field of Classification Search
None
See application file for complete search history.

(56) References Cited

U.S. PATENT DOCUMENTS 4,457,345 A * 7/1984 von Blucher ...... A41D 31/0011
139/420 R
5,910,456 A    6/1999 Matsuhisa et al.
(Continued)

FOREIGN PATENT DOCUMENTS

EP    2 628 827 A1    8/2013
EP    2 735 575 A1    5/2014
(Continued)

OTHER PUBLICATIONS

JP 2011-122255 A Machine Translation.*
(Continued)

*Primary Examiner* — Ronak C Patel
*Assistant Examiner* — Thomas A Mangohig
(74) *Attorney, Agent, or Firm* — Oblon, McClelland, Maier & Neustadt, L.L.P.

(57) ABSTRACT

Provided are a carbon fiber thermoplastic resin prepreg which is a carbon fiber prepreg obtained by impregnating a PAN-based carbon fiber in which the average fiber fineness of a single fiber is 1.0 dtex to 2.4 dtex with a thermoplastic resin, wherein the thermoplastic resin satisfies 20≤(FM/FS) ≤40 (where FM: flexural modulus (MPa) of a resin sheet comprising only the thermoplastic resin, and FS: flexural strength (MPa) of the resin sheet), a method for manufacturing the same, and a carbon fiber composite material employing the carbon fiber prepreg.

14 Claims, 5 Drawing Sheets

(51) Int. Cl.
| | |
|---|---|
| B29B 11/16 | (2006.01) |
| C08J 5/24 | (2006.01) |
| B29K 23/00 | (2006.01) |
| B29K 77/00 | (2006.01) |
| B29K 105/08 | (2006.01) |
| B29K 233/20 | (2006.01) |
| B29K 307/04 | (2006.01) |
| B29K 33/20 | (2006.01) |
| B29L 31/30 | (2006.01) |

(52) U.S. Cl.
CPC ............ B29C 70/506 (2013.01); C08J 5/24 (2013.01); *B29C 70/50* (2013.01); *B29K 2023/12* (2013.01); *B29K 2033/20* (2013.01); *B29K 2077/00* (2013.01); *B29K 2105/0872* (2013.01); *B29K 2233/20* (2013.01); *B29K 2307/04* (2013.01); *B29L 2031/30* (2013.01); *C08J 2325/12* (2013.01); *C08J 2333/10* (2013.01); *C08J 2333/12* (2013.01); *C08J 2333/20* (2013.01); *C08J 2369/00* (2013.01); *C08J 2377/02* (2013.01); *C08J 2377/06* (2013.01); *Y10T 428/2982* (2015.01)

(56) References Cited

U.S. PATENT DOCUMENTS

| | | | |
|---|---|---|---|
| 2009/0035570 A1 | 2/2009 | Mao et al. | |
| 2011/0143110 A1* | 6/2011 | Tsuchiya et al. | ............ 428/213 |
| 2012/0088104 A1* | 4/2012 | Hashimoto | ............... D01F 6/18 |
| | | | 428/398 |

FOREIGN PATENT DOCUMENTS

| | | | | | |
|---|---|---|---|---|---|
| JP | 6-146120 | A | 5/1994 | | |
| JP | 09-155862 | A | 6/1997 | | |
| JP | 2001-226855 | A | 8/2001 | | |
| JP | 2002-212383 | A | 7/2002 | | |
| JP | 2002-266173 | A | 9/2002 | | |
| JP | 2004-076246 | A * | 3/2004 | ............ | B29B 15/10 |
| JP | 2005-36320 | A | 2/2005 | | |
| JP | 3681127 | B2 | 8/2005 | | |
| JP | 2008-044999 | A | 2/2008 | | |
| JP | 2008-202207 | | * 9/2008 | ............... | D01F 9/22 |
| JP | 2008-202207 | | 9/2008 | | |
| JP | 2010-235779 | A | 10/2010 | | |
| JP | 2010-285710 | | 12/2010 | | |
| JP | 2011-006578 | A | 1/2011 | | |
| JP | 2011-16911 | A | 1/2011 | | |
| JP | 2011-122255 | A | 6/2011 | | |
| WO | WO 2010/143680 | A1 * | 12/2010 | ............ | D01D 5/247 |
| WO | WO 2010/143681 | A1 | 12/2010 | | |

OTHER PUBLICATIONS

Machine translation of JP 2004-076246 A. dated Mar. 11, 2004.*
JP 2004-076246 A English language abstract. dated Mar. 11, 2004.*
JP 2011-122255 A Machine Translation. dated Jun. 23, 2011.*
International Search Report dated Jul. 2, 2013 in PCT/JP2013/059736 filed Mar. 29, 2013.
Extended European Search Report dated Mar. 3, 2015 in Patent Application No. 13768627.5.
Japanese Office Action dated Apr. 1, 2015 in Patent Application No. 2013-517499 (with English Translation).
Zhiwei Xu et al., "Effect of Kidney-type and Circular Cross Sections on Carbon Fiber Surface and Composite Interface", Composites Part A: applied science and manufacturing, vol. 39, No. 2, XP022451164, Nov. 4, 2007, pp. 301-307.
Yutaka Maeda, "Carbon Fiber-New Applications and Future Prospect of Technology and Market", Japan, CMC Publishing Co., Ltd., Nov. 30, 2000, (with English Translation of pp. 30 and 31), 5 pages.
Office Action dated Oct. 20, 2015 in Japanese Patent Application No. 2013-517499 w/attached English translation.
Final Office Action dated Apr. 30, 2018 in U.S. Appl. No. 15/499,128.
Office Action dated Nov. 27, 2018, in co-pending U.S. Appl. No. 15/499,128 Examiner T. Mangohig.

* cited by examiner

[Fig. 1]
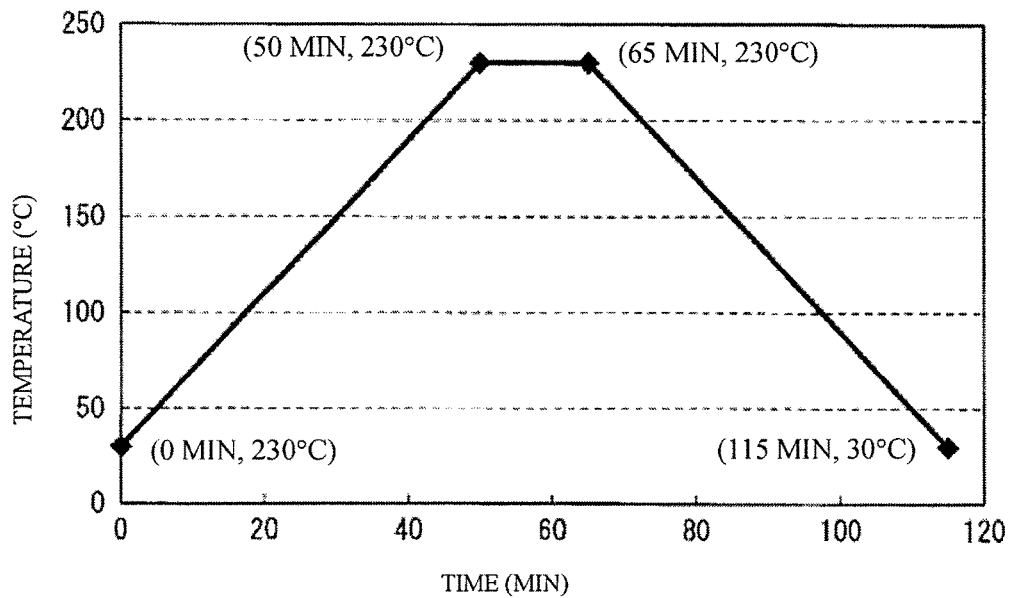
[Fig. 2]
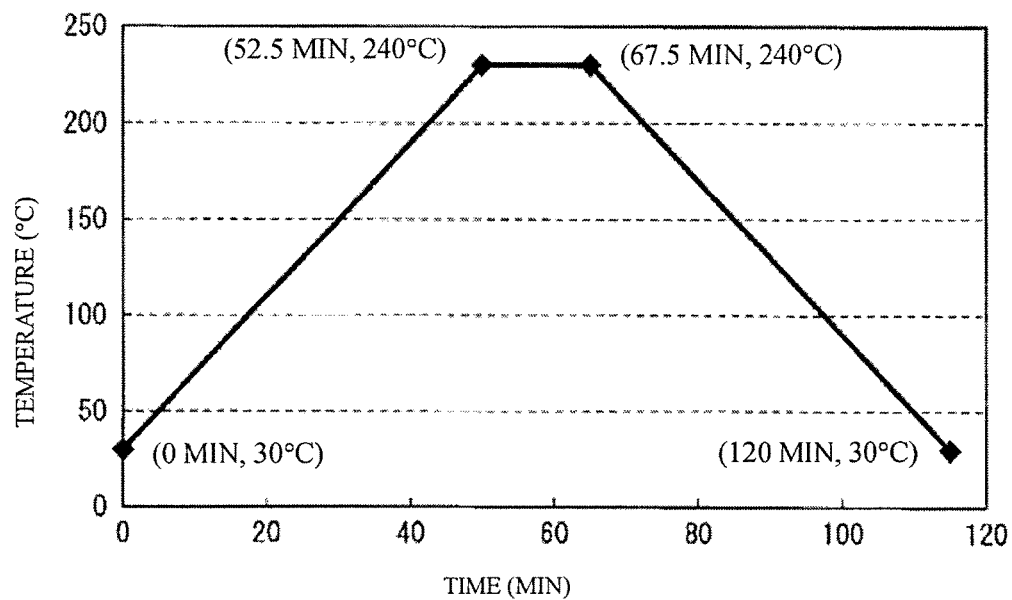

[Fig. 3]
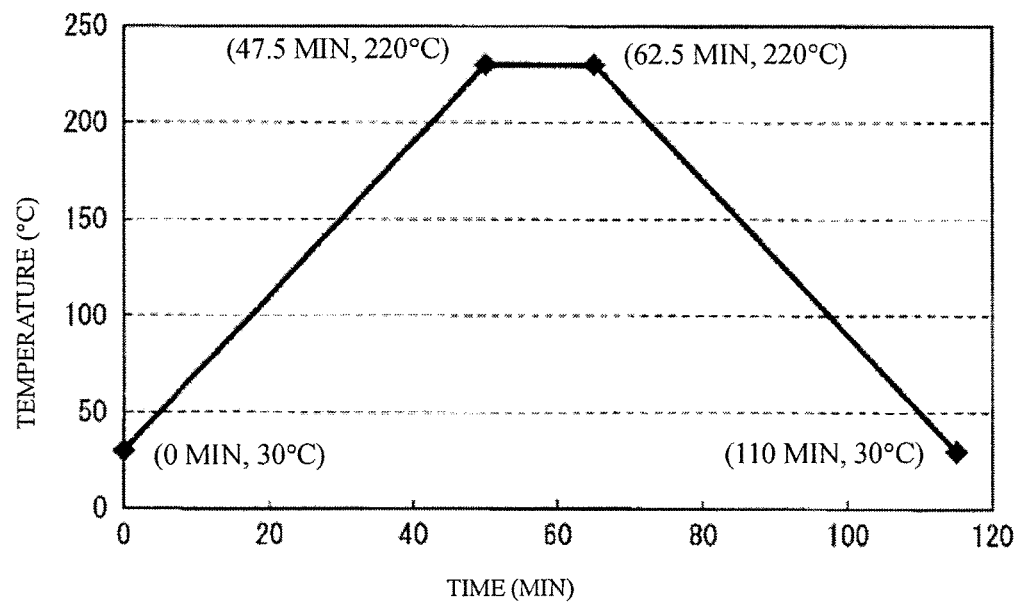
[Fig. 4]
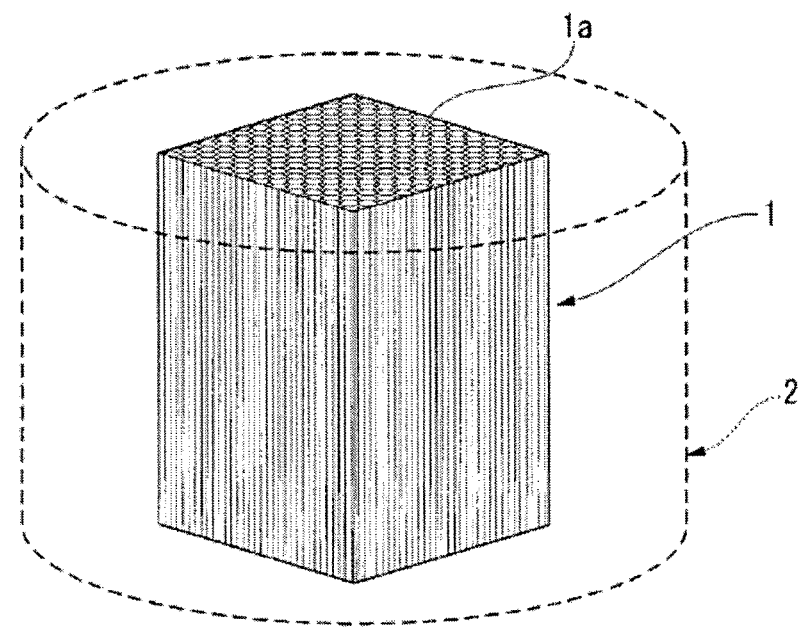

[Fig. 5]
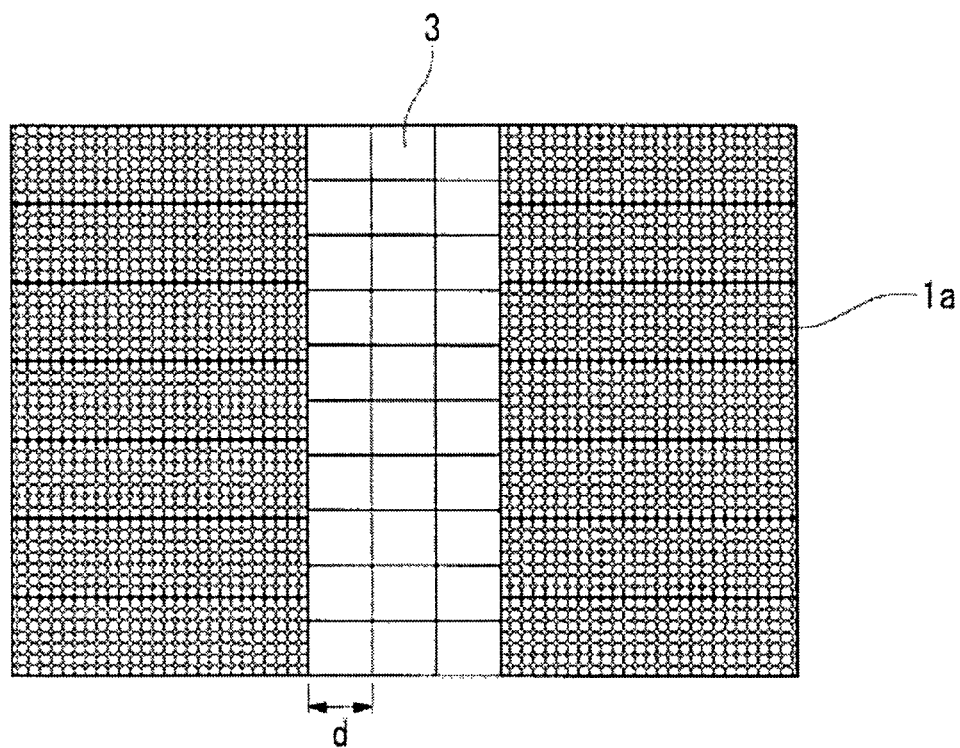

[Fig. 6A]
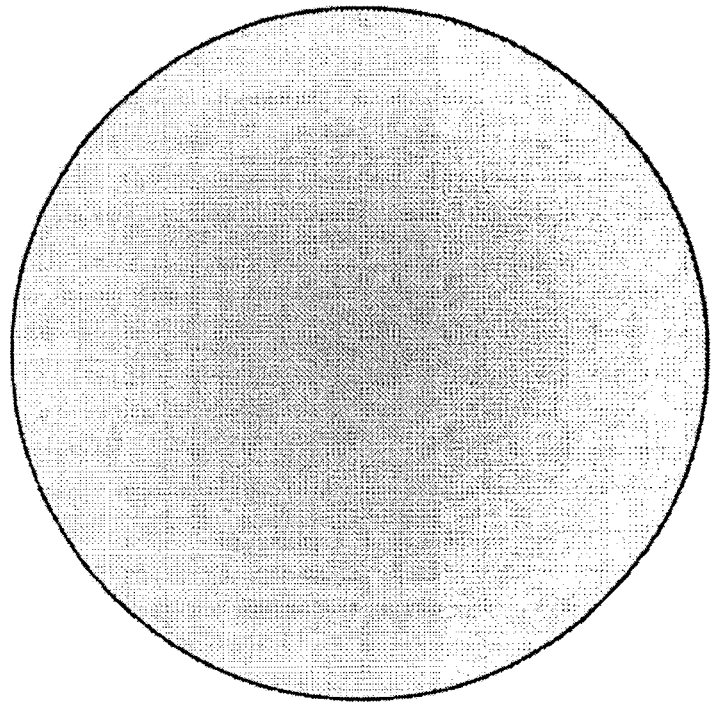
[Fig. 6B]
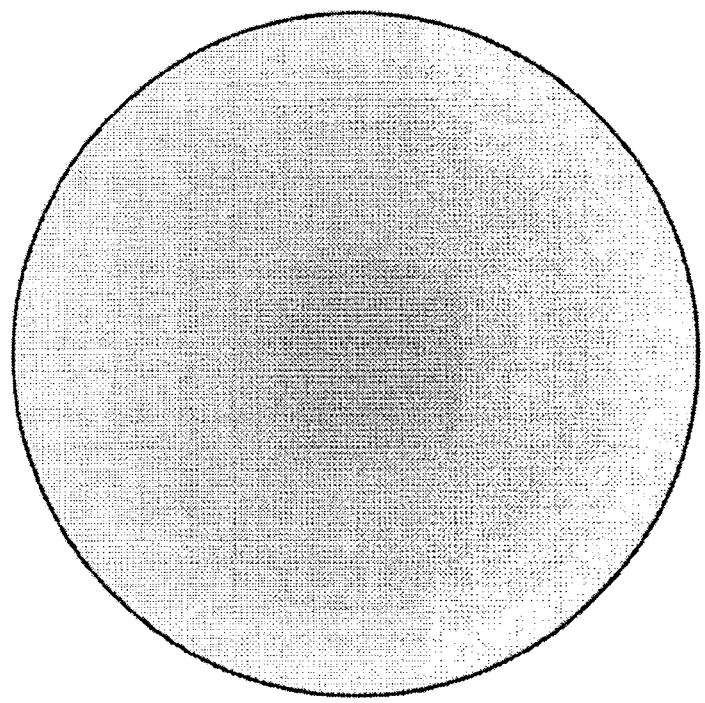

[Fig. 7]
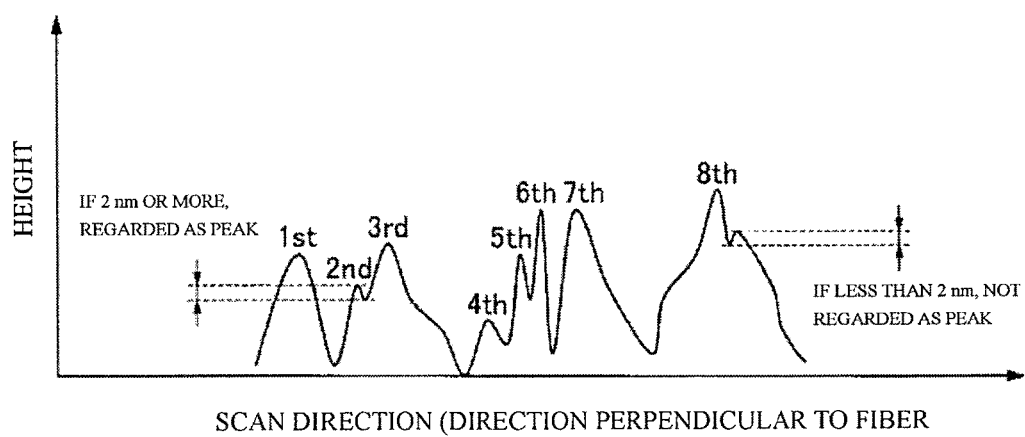

CARBON FIBER THERMOPLASTIC RESIN PREPREG, CARBON FIBER COMPOSITE MATERIAL AND PRODUCING METHOD

TECHNICAL FIELD

The present invention relates to a carbon fiber thermoplastic resin prepreg containing carbon fibers and a thermoplastic resin, a carbon fiber composite material, and a production method.

The present patent application claims priority based on Japanese Patent Application No. 2012-075986 filed in Japan on Mar. 29, 2012, and Japanese Patent Application No. 2012-093950 filed in Japan on Apr. 17, 2012, the disclosures of which are incorporated herein.

For a reinforcing fiber prepreg containing reinforcing fibers such as carbon fibers and a thermoplastic resin, it is important to uniformly disperse the reinforcing fibers therein. This is because if there exist regions having a large amount of the thermoplastic resin or regions having a large amount of the fibers because the fiber dispersity in the prepreg is low, when stress is exerted on a composite material molded article using the prepreg, stress is concentrated in non-uniform parts, and there is a high possibility that the non-uniform parts may become the starting points of destruction.

When a thermoplastic resin prepreg containing reinforcing fibers such as carbon fibers and a thermoplastic resin is produced by a melting method, it is desirable to make the thermoplastic resin at the time of impregnation less viscous, in order to uniformly impregnate reinforcing fiber bundles with the thermoplastic resin. If it is intended to decrease the viscosity of a thermoplastic resin, it is general to raise the temperature; however, when a high temperature is employed, thermal decomposition of the thermoplastic resin (lowering of molecular weight) may proceed. Therefore, such a thermoplastic resin is not suitable as a material for obtaining a composite material (molded article) by heating again.

Meanwhile, Patent Document 1 describes that a prepreg is produced using a thermoplastic resin having a viscosity at a temperature lower by 10° C. than the thermal decomposition initiation temperature, of 5 Pa·s to 500 Pa·s.

Furthermore, regarding other methods for producing a thermoplastic resin prepreg containing reinforcing fibers such as carbon fibers and a thermoplastic resin, there are available a method of producing a prepreg by impregnating reinforcing fibers with a thermoplastic resin, by immersing reinforcing fiber bundles in a suspension of fine particles of a thermoplastic resin, thereby attaching these resin fine particles to the reinforcing fibers, and heating and melting the resin fine particles (Patent Document 2); and a method of producing a prepreg by attaching thermoplastic resin fine particles to reinforcing fiber bundles, and using a binder resin solution (Patent Document 3).

Molding of a fiber-reinforced composite material which uses a thermoplastic resin prepreg containing reinforcing fibers such as carbon fibers and a thermoplastic resin as an intermediate base material, is carried out by laminating prepregs, or dispersing and laminating prepreg flakes obtained by cutting prepregs, subsequently heating this laminate, further cooling the laminate under pressure, and thereby consolidating the thermoplastic resin contained in the prepreg. Since fiber-reinforced composite materials each containing a thermoplastic resin as a matrix resin have excellent impact resistance and can be molded in a short time, the fiber-reinforced composite materials are optimal for automobile parts and the like (Patent Document 4).

Furthermore, regarding the technique for molding a fiber-reinforced composite material containing a thermoplastic resin as a matrix resin, an injection molding method using pellets such as long fiber pellets (LFP) is also known in addition to the technique of using a prepreg (Patent Document 5). However, the injection molding method has a problem that it is difficult to produce a fiber-reinforced composite material having a fiber volume percentage content of 30% by volume or more, and adaptation of the molding method to members where high strength and high rigidity are required is not suitable.

CITATION LIST

Patent Document

Patent Document 1: JP 2011-6578 A
Patent Document 2: JP 2008-44999 A
Patent Document 3: Japanese Patent No. 3681127
Patent Document 4: JP 9-155862 A
Patent Document 5: JP 2002-212383 A

DISCLOSURE OF THE INVENTION

Problem to be Solved by the Invention

However, there are occasions in which the viscosity of the resin at a temperature lower by 10° C. than the thermal decomposition initiation temperature as described in Patent Document 1 may be such that the viscosity at the time of actual prepreg production or the viscosity at the time of actual press molding is different from the viscosity measured only with the resin. Therefore, it may be insufficient to define only the viscosity of the resin at a temperature lower by 10° C. than this thermal decomposition initiation temperature. Furthermore, none is described in Patent Document 1 particularly in connection with the flexural modulus and flexural strength of the thermoplastic resin that is used as the matrix resin. In the method of Patent Document 2 or 3, it is necessary to prepare the thermoplastic resin into fine particles or into a suspension, and there are occasions in which it may be difficult to uniformly disperse resin fine particles into the reinforcing fiber bundles, so that further amelioration is desirable. On the other hand, it is relatively easy to form a film of a thermoplastic resin, and if a thermoplastic resin is used in a state of being fabricated into a uniform film, when reinforcing fibers are impregnated with a thermoplastic resin, it is easy to uniformly supply this resin, and a prepreg having a uniform thickness can be produced easily. However, there are occasions in which a thermoplastic resin having excellent mechanical characteristics is generally highly viscous, and the reinforcing fibers are not uniformly dispersed in the resulting prepreg. Therefore, there has been a demand to develop a method for producing a prepreg in which both a thermoplastic resin and reinforcing fibers are uniformly dispersed.

Molding of a fiber-reinforced composite material which uses a thermoplastic resin prepreg containing reinforcing fibers such as carbon fibers and a thermoplastic resin as an intermediate base material, is superior compared to an injection molding method using LFP or the like, from the viewpoint that the fiber orientation of the fibers can be arbitrarily designed. However, when a thermoplastic resin prepreg is integrated by heating and then cooling under pressure, there is a problem that the fibers exhibit micromeandering due to contraction of the matrix resin at the time of cooling, and the strength exhibition ratio is decreased. Furthermore, generally, the thermal resistance temperature of a fiber-reinforced composite material containing a thermoplastic resin as a matrix is dependent on the thermal resistance temperature of the matrix resin; however, a prepreg using a matrix resin having a high thermal resistance temperature requires a high temperature at the time of molding, and has a problem that this micromeandering is intensified. An object of the present invention is to provide a carbon fiber thermoplastic resin prepreg that exhibits less micromeandering and excellent exhibition ratio, and a carbon fiber-reinforced composite material.

Another object of the present invention is to provide a carbon fiber thermoplastic resin prepreg capable of providing a carbon fiber composite material which, even if a thermoplastic resin having excellent mechanical characteristics, such as a polymethyl methacrylate resin (PMMA resin), an acrylonitrile-styrene copolymer resin (AS resin), or a polyamide-12 resin (PA12 resin) as the matrix resin, has carbon fibers uniformly dispersed therein and thereby exhibits high flexural strength; a method for producing the prepreg; and a carbon fiber composite material using the prepreg.

Means for Solving Problem

The inventors of the present invention repeatedly conducted thorough investigations in order to achieve the object described above, and as a result, the inventors finally completed the present invention. The present invention includes the following embodiments.

[1] A carbon fiber thermoplastic resin prepreg formed by impregnating a carbon fiber bundle composed of plural carbon fibers having an average single fiber fineness of 1.0 dtex to 2.4 dtex, with a thermoplastic resin composition.

[2] The carbon fiber thermoplastic resin prepreg described in [1], wherein the thermoplastic resin composition is a thermoplastic resin that satisfies the following formula (1):

$$20 \leq (FM/FS) \leq 40 \tag{1}$$

wherein in Formula (1), FM represents the flexural modulus (MPa) of a resin plate formed from this thermoplastic resin composition only; and FS represents the flexural strength (MPa) of the resin plate.

[3] The carbon fiber thermoplastic resin prepreg described in [1] or [2], wherein the thermoplastic resin composition is a thermoplastic resin composition that satisfies the following formula (2):

$$25 \leq (FM/FS) \leq 35 \tag{2}$$

wherein in Formula (2), FM represents the flexural modulus (MPa) of a resin plate formed from this thermoplastic resin composition only; and FS represents the flexural strength (MPa) of the resin plate.

[4] A method for producing a carbon fiber thermoplastic resin prepreg, the method including a step of obtaining a carbon fiber prepreg by impregnating a PAN-based carbon fiber bundle having an average single fiber fineness of from 1.0 dtex to 2.4 dtex, with a thermoplastic resin composition, wherein the thermoplastic resin composition is a thermoplastic resin composition that satisfies the following formula (3):

$$20 \leq (FM/FS) \leq 40 \tag{3}$$

wherein in Formula (1), FM represents the flexural modulus (MPa) of a resin plate formed from this thermoplastic resin composition only; and FS represents the flexural strength (MPa) of the resin plate.

[5] The method for producing a carbon fiber thermoplastic resin prepreg described in [4], wherein the thermoplastic resin composition is in a film form.

[6] A carbon fiber composite material formed from the carbon fiber thermoplastic resin prepreg described in any one item of [1] to [3].

[7] The carbon fiber thermoplastic resin prepreg described in [1], wherein the degree of circularity of a single fiber of the carbon fiber that constitutes the carbon fiber bundle is 0.70 to 0.90, provided that the degree of circularity can be determined by the following formula (4), wherein S represents the cross-sectional area of the single fiber; and L represents the circumferential length of the cross-section of a single fiber:

$$\text{Degree of circularity} = 4\pi S/L^2 \tag{4}$$

[8] The carbon fiber thermoplastic resin prepreg described in [1] or [7], wherein the carbon fiber bundle is a PAN-based carbon fiber bundle.

[9] The carbon fiber thermoplastic resin prepreg described in [7] or [8], satisfying the following formula (5):

$$\beta \times (Tc-25) \times (100-Vf) > 0.5 \tag{5}$$

wherein $\beta$ represents the coefficient of linear expansion (1/° C.) of the thermoplastic resin composition; Tc represents the lower limit temperature for molding (° C.) of the thermoplastic resin composition, provided that regarding the lower limit temperature for molding, in a case in which the thermoplastic resin composition has a melting point, the lower limit temperature for molding represents the melting point of the thermoplastic resin composition, and in a case in which the thermoplastic resin composition does not have a melting point, the lower limit temperature for molding represents the temperature at which the viscosity of the composition is $1 \times 10^4$ Pa·s; and Vf represents the fiber volume percentage content (% by volume) of the carbon fiber thermoplastic resin prepreg.

[10] The carbon fiber thermoplastic resin prepreg described in any one item of [7] to [9], wherein the thermoplastic resin composition is at least one kind of resin selected from a polypropylene resin, a polyamide resin, a modified resin of a polypropylene resin, and a modified resin of a polyamide resin.

[11] Carbon fiber thermoplastic resin prepreg flakes, obtained using the carbon fiber prepreg described in any one item of [7] to [10].

[12] A carbon fiber-reinforced composite material, obtained using the carbon fiber thermoplastic resin prepreg described in any one item of [7] to [10].

[13] A carbon fiber-reinforced composite material, obtained using the carbon fiber thermoplastic resin prepreg flakes described in [11].

[14] An automobile part, obtained using the carbon fiber-reinforced composite material described in [12] or [13].

Effect of the Invention

According to the present invention, there are provided a carbon fiber thermoplastic resin prepreg capable of providing a carbon fiber composite material that, even in a case in which a thermoplastic resin having excellent mechanical characteristics, such as polymethyl methacrylate (PMMA), an acrylonitrile-styrene copolymer resin (AS resin) or a polyamide 12 (PA12) is used as the matrix resin, has carbon fibers uniformly dispersed therein and thereby exhibits high flexural strength; a method for producing the carbon fiber thermoplastic resin prepreg; and a carbon fiber composite material that uses the prepreg. Furthermore, according to the present invention, there can be provided a carbon fiber thermoplastic resin prepreg from which a carbon fiber-reinforced composite material exhibits excellent impact resistance, a shorter molding time, and less micromeandering of the fibers can be obtained; and a carbon fiber-reinforced composite material and an automobile part, both obtainable using the carbon fiber thermoplastic resin prepreg.

BRIEF DESCRIPTION OF DRAWINGS

FIG. 1 is a graph showing examples of the temperature profile conditions adopted when a carbon fiber composite material (molded article) is produced using a PMMA resin as a thermoplastic resin;

FIG. 2 is a graph showing examples of the temperature profile conditions adopted when a carbon fiber composite material (molded article) is produced using an AS resin as the thermoplastic resin;

FIG. 3 is a graph showing examples of the temperature profile conditions adopted when a carbon fiber composite material (molded article) is produced using a PA12 resin as the thermoplastic resin;

FIG. 4 is a conceptual diagram illustrating an example of embedding a unidirectionally reinforced carbon fiber composite material molded plate in a polyester resin for the measurement of fiber dispersity;

FIG. 5 is a conceptual diagram illustrating an example of determining the respective areas of the carbon fibers and the matrix resin for the measurement of fiber dispersity;

FIG. 6A is a diagram showing an image observed by SEM after subjecting a cross-section perpendicular to the fiber longitudinal direction of a single fiber that constitutes a carbon fiber bundle, to a mirror surface finishing;

FIG. 6B is a diagram showing an image observed by SEM after subjecting a cross-section perpendicular to the fiber longitudinal direction of a single fiber that constitutes a carbon fiber bundle, to a mirror surface finishing; and FIG. 7 is a diagram showing the conditions for an image analysis.

MODE(S) FOR CARRYING OUT THE INVENTION

<Carbon Fiber Thermoplastic Resin Prepreg>

The carbon fiber thermoplastic resin prepreg according to a first embodiment of the present invention is a carbon fiber thermoplastic resin prepreg formed by impregnating a carbon fiber bundle composed of plural carbon fibers having an average single fiber fineness of 1.0 dtex to 2.4 dtex, with a thermoplastic resin composition. For example, a carbon fiber thermoplastic resin prepreg having a structure in which a carbon fiber bundle having an average single fiber fineness of from 1.0 dtex to 2.4 dtex is impregnated with a thermoplastic resin having excellent mechanical characteristics, that is, satisfying the following Formula (1), may be mentioned as a preferred example. That is, the carbon fiber thermoplastic resin prepreg of the present invention is formed from this thermoplastic resin that serves as a matrix resin, and these carbon fibers. Meanwhile, dtex represents the mass of a fiber per length of 10,000 m, expressed in gram unit.

$$20 \leq (FM/FS) \leq 40 \tag{1}$$

In Formula (1), FM represents the flexural modulus (MPa) of a resin plate formed from this thermoplastic resin only, and FS represents the flexural strength (MPa) of this resin plate. These FM and FS can be both determined by measuring the properties of a specimen produced by sufficiently drying the thermoplastic resin to be measured and then molding by injection molding, by the method according to ISO178 at a temperature of $23\pm2°$ C.

The carbon fiber thermoplastic resin prepreg of the present invention not only includes an impregnated prepreg in which the carbon fiber bundle is completely impregnated with the thermoplastic resin, but may also include a semi-impregnated prepreg (semipreg) in which the carbon fiber bundle and the thermoplastic resin are integrated without completely impregnating the carbon fiber bundle with the thermoplastic resin.

In the present invention, plural carbon fiber bundles can be used for a single prepreg. In that case, only one kind of carbon fiber bundle may be used, or plural kinds of carbon fiber bundles may also be used in combination. Furthermore, the carbon fiber bundles may be used in the form of being regularly arranged in the prepreg, or may be used in the form of being irregularly arranged. However, in the case of using the carbon fiber thermoplastic resin prepreg for an application where it is required that the specific strength and the specific elastic modulus be high in a specific direction, usually, it is most preferable to use a prepreg in which carbon fiber bundles are arranged in a single direction.

The direction of orientation of carbon fibers in the carbon fiber thermoplastic resin prepreg can be checked by observing a cut surface obtainable by cutting this carbon fiber thermoplastic resin prepreg almost perpendicularly to the fiber axial direction, using a SEM (scanning electron microscope) or an optical microscope.

The carbon fiber thermoplastic resin prepreg of the present invention is a product in which the thermoplastic resin is impregnated in between adjoining carbon fiber bundles in these plural carbon fiber bundles, or into the interior of these plural carbon fiber bundles. Furthermore, the carbon fiber thermoplastic resin prepreg may have a structure in which the thermoplastic resin is adhering to the surface of these plural carbon fiber bundles.

Furthermore, the carbon fiber used in the carbon fiber thermoplastic resin prepreg of the present invention is preferably a continuous fiber, from the viewpoint that the carbon fiber composite material thus obtainable exhibits a high elastic modulus or high strength. A continuous fiber is a fiber having a fiber length of 100 mm or more in a state of being connected without breaking regularly or irregularly.

It is particularly preferable that the carbon fiber used in the present invention be a continuous fiber, and be oriented in a single direction (UD) in the carbon fiber thermoplastic resin prepreg.

In the present invention, when the carbon fiber thermoplastic resin prepreg is produced, carbon fibers can be used in the form of a bundle of plural strands, that is, in the form of a carbon fiber bundle (usually, referred to as carbon fiber tow). The number of carbon fibers (single fibers) that constitute a carbon fiber bundle may be appropriately set up, but for example, the number may be adjusted to 1000 to 60,000 fibers.

Furthermore, when the carbon fiber thermoplastic resin prepreg is produced, carbon fibers can be used in the form of a carbon fiber sheet in which a large number of carbon fibers are arranged on the same plane to be in a sheet shape.

Furthermore, carbon fibers can also be used in the form of a carbon fiber sheet in which the carbon fiber bundles are arranged at equal intervals and on the same plane to be in a sheet shape. The weight per area of the carbon fibers in this carbon fiber sheet (FAW: Fiber Areal Weight) is preferably 50 g/m$^2$ or more from the viewpoint of easy fiber spreading, and is preferably 500 g/m$^2$ or less from the viewpoints of easy impregnability of the thermoplastic resin and handleability of the carbon fiber thermoplastic resin prepreg thus obtained. Furthermore, from the viewpoint of the ease of laminating the prepreg, the weight per area is more preferably 100 g/m$^2$ or more, and from the viewpoint of the impregnability of a high viscosity resin, the weight per area is more preferably 250 g/m$^2$ or less.

In regard to the carbon fiber thermoplastic resin prepreg of the present invention, this weight per area FAW of the carbon fiber can be calculated by cutting a certain area (for example, 100 cm$^2$) from a carbon fiber sheet, measuring the mass of the flakes, and converting the mass to a value relative to 1 m$^2$ of the carbon fiber sheet. Furthermore, the weight per area of the carbon fiber thermoplastic resin prepreg of the present invention (TAW: Total Areal Weight) is preferably 75 g/m$^2$ or more from the viewpoint of easy fiber spreading, and is preferably 1000 g/m$^2$ or less from the viewpoints of easy impregnability of the thermoplastic resin and handleability of the carbon fiber thermoplastic resin prepreg thus obtained. Furthermore, the TAW is more preferably 150 g/m$^2$ or more from the viewpoint of the ease of lamination of the prepreg, and is more preferably 500 g/m$^2$ or less from the viewpoint of impregnability of the high viscosity resin. This weight per area TAW of the carbon fiber prepreg can be calculated by measuring the mass of a carbon fiber prepreg cut to a certain area, and converting the mass to a value relative to 1 m$^2$. Specifically, the TAW is preferably 75 g/m$^2$ to 1000 g/m$^2$, and more preferably 150 g/m$^2$ to 500 g/m$^2$.

Meanwhile, the mass percentage content (Wf) of PAN-based carbon fibers in the carbon fiber thermoplastic resin prepreg relative to the total mass of the carbon fiber thermoplastic resin prepreg can be calculated by FAW/TAW×100 (mass %).

This Wf is preferably 30% by mass or more from the viewpoint of obtaining high mechanical characteristics of the carbon fiber composite material thus obtained, and is preferably 70% by mass or less from the viewpoint of obtaining a composite material with a reduced amount of voids. The Wf is more preferably 40% by mass or more from the viewpoint of obtaining a composite material with less fiber meandering, and is more preferably 60% by mass or less from the viewpoint of obtaining a composite material with a reduced amount of voids even for a high viscosity resin. Specifically, the Wf is preferably 30% to 70% by mass, and more preferably 40% to 60% by mass.

<Thermoplastic Resin Composition>
(Thermoplastic Resin)

In the thermoplastic resin composition used in the carbon fiber thermoplastic resin prepreg of the present invention, it is preferable to use a thermoplastic resin that satisfies the above Formula (1): 20≤9 FM/FS)≤40. In general, for a carbon fiber thermoplastic resin prepreg, for example, the following thermoplastic resins are used as the matrix resin: namely, a polycarbonate resin, a polyester resin, a polyamide (PA) resin, a liquid crystal polymer resin, a polyether sulfone resin, a polyether ether ketone resin, a polyallylate resin, a polyphenylene ether resin, a polyphenylene sulfide (PPS) resin, a polyacetal resin, a polysulfone resin, a polyimide resin, a polyolefin resin, a polystyrene resin, a modified polystyrene resin, an AS resin (copolymer of acrylonitrile and styrene), an ABS resin (copolymer of acrylonitrile, butadiene and styrene), a modified ABS resin, an MBS resin (copolymer of methyl methacrylate, butadiene and styrene), a modified MBS resin, a polymethyl methacrylate (PMMA) resin, a modified polymethyl methacrylate resin, and polymer alloy resins thereof. Regarding these, an appropriate resin can be selected based on heat resistance, chemical resistance, and mechanical characteristics. These may be used singly, or may be used in combination of two or more kinds thereof. It is preferable to use two or more kinds thereof in combination.

However, regarding the thermoplastic resin that can be used in the carbon fiber thermoplastic resin prepreg of the present invention, it is preferable to use a thermoplastic resin satisfying the above Formula (1): 20≤(FM/FS)≤40 and having excellent mechanical characteristics. When the ratio (FM/FS) of the flexural modulus FM (MPa) with respect to the flexural strength FS (MPa) of this thermoplastic resin is 20 or more, high strength can be obtained when produced into a composite material; and when the ratio is 40 or less, high impact resistance performance can be obtained when produced into a composite material. Furthermore, it is preferable to adjust this ratio (FM/FS) to 25 or more from the viewpoint of obtaining a high elastic modulus when produced into a composite material, and it is preferable to adjust the ratio to 35 or less from the viewpoint that delamination does not easily occur when produced into a composite material. That is, it is preferable that the thermoplastic resin satisfy Formula (2): 25≤(FM/FS)≤35.

Specific examples of the thermoplastic resin that satisfies the above Formula (1) include the following resins: namely, a PMMA resin (specifically, manufactured by Mitsubishi Rayon Co., Ltd., trade name: TF8, TF9 or the like), an AS resin (specifically, manufactured by UMG ABS, Ltd., trade name: AP-H or the like), a PA12 resin (specifically, manufactured by Arkema SA, AMN-O-TLD or the like), a PPS resin (specifically, manufactured by Toray Industries, Inc., trade name: A900 or the like), a PA6 resin (specifically, manufactured by Ube Industries, Ltd., trade name: 101313; manufactured by Toyobo Co., Ltd., trade name: T803 or the like), and a PP (polypropylene) resin (specifically, manufactured by Mitsubishi Chemical Corp., trade name: MODIC (registered trademark) P958 or the like).

Furthermore, examples of the thermoplastic resin that satisfies the above Formula (2) include the following resins: namely, a PMMA resin (specifically, manufactured by Mitsubishi Rayon Co., Ltd., trade name: TF8, TF9 or the like), an AS resin (specifically, manufactured by UMG ABS, Ltd., trade name: AP-H or the like), a PA12 resin (specifically, manufactured by Arkema SA, AMN-O-TLD or the like), a PPS resin (specifically, manufactured by Toray Industries, Inc., trade name: A900 or the like), and a PA6 resin (specifically, manufactured by Toyobo Co., Ltd., trade name: T803 or the like).

Among these, from the viewpoint of having a high FM, it is preferable to use an AS resin or a PMMA resin, both of which satisfy the above Formula (1) as thermoplastic resins.

Meanwhile, the flexural modulus (FM) or the flexural strength (FS) can be appropriately set up according to the thermoplastic resin used, to the extent of satisfying the above Formula (1). For example, when a PMMA resin is used as the thermoplastic resin, the flexural modulus may be set to, for example, from 3000 MPa to 3500 MPa, and the flexural strength may be set to, for example, from 90 MPa to 120 MPa. Also, when an AS resin is used as the thermoplastic resin, the flexural modulus may be set to, for example, from 3300 MPa to 3600 MPa, and the flexural strength may be set to, for example, from 90 MPa to 110 MPa.

<Thermoplastic Resin Composition>

It is preferable for the thermoplastic resin composition that can be used in the carbon fiber thermoplastic resin prepreg of the present invention that the value of the following Formula (5) that is determined from the lower limit temperature for molding Tc (° C.) and the coefficient of linear expansion β (1/° C.) of the thermoplastic resin composition, and the fiber volume percentage content Vf (volume %) of the carbon fiber thermoplastic resin prepreg, be more than 0.5. Here, the lower limit temperature for molding is the melting point in a case in which the thermoplastic resin composition is a crystalline resin having a melting point; and is a temperature Tx (° C.) at which the zero shear viscosity is $2 \times 10^3$ Pa·s in a case in which the thermoplastic resin composition is an amorphous resin that does not have a melting point.

$$\beta \times (Tc-25) \times (100-Vf) \qquad (5)$$

In a case in which the value of Formula (5) is more than 0.5, when this thermoplastic resin composition is heated from 25° C. to the lower limit temperature for molding and subsequently cooled to 25° C. during the operation of producing a carbon fiber-reinforced composite material using the thermoplastic resin composition, the value of Formula (5) is in a region in which the carbon fibers in the carbon fiber-reinforced composite material is prone to undergo micromeandering due to the difference in the expansion/contraction behavior of the carbon fiber bundles and the thermoplastic resin composition. However, in a carbon fiber-reinforced composite material using the carbon fiber thermoplastic resin prepreg of the present invention, since micromeandering of the carbon fibers does not occur, deterioration of the mechanical properties of the carbon fiber-reinforced composite material is suppressed, which is preferable. Meanwhile, the coefficient of linear expansion β can be measured according to JIS K7197 (1991).

The kind of the thermoplastic resin included in the thermoplastic resin composition is not particularly limited as long as the above Formula (5) is satisfied when the thermoplastic resin composition is used to produce a carbon fiber thermoplastic resin prepreg, and examples thereof include a polycarbonate resin, a polyester resin, a polyamide resin, a liquid crystal polymer resin, a polyether sulfone resin, a polyether ether ketone resin, a polyallylate resin, a polyphenylene ether resin, a polyphenylene sulfide resin, a polyacetal resin, a polysulfone resin, a polyimide resin, a polyolefin resin, a polystyrene resin, a modified polystyrene resin, an ABS resin, a modified ABS resin, an MBS resin, a polymethyl methacrylate resin, and modified resins thereof, as well as polyalloy resins thereof. These may be used singly, or may be used in combination of two or more kinds thereof. It is preferable to use two or more kinds thereof in combination. Among them, a polypropylene resin, a polyamide resin, a polycarbonate resin, and modified resins of the respective resins are preferred. Also, more preferred is an acid-modified polypropylene resin, a polyamide-6 resin, a polyamide-610 resin, or a polycarbonate resin. Among them, a polyamide-6 resin is preferred.

(PAN-Based Carbon Fiber)

The PAN-based carbon fiber used in the present invention is such that the average single fiber fineness is from 1.0 dtex to 2.4 dtex. When the average single fiber fineness is adjusted to 1.0 dtex or more, micromeandering of the fibers in the carbon fiber-reinforced composite material is suppressed, and a carbon fiber-reinforced composite material having excellent strength developability is obtained. A more preferred range of the average single fiber fineness is 1.1 dtex to 2.0 dtex, and an even more preferred range of the average single fiber fineness is 1.2 dtex to 1.6 dtex. Here, the average single fiber fineness can be determined by the method described in section <Measurement of average single fiber fineness of carbon fiber bundle> that will be described below. Meanwhile, the average single fiber fineness of the PAN-based carbon fiber can be adjusted by the average single fiber fineness of the PAN-based fiber that serves as a precursor (PAN-based carbon fiber precursor fiber).

The degree of circularity of a single fiber of the carbon fiber that constitutes the carbon fiber bundle used in the present invention is preferably 0.70 to 0.90. If the degree of circularity is less than 0.70, micromeandering of the fibers in the carbon fiber-reinforced composite material becomes noticeable as a result of local stress concentration within single fibers (filaments), and the mechanical properties of the carbon fiber-reinforced composite material are deteriorated. If the degree of circularity is more than 0.90, a decrease in the interfacial adhesive strength caused by a decrease in the interfacial adhesion area between the fibers and the matrix resin, causes deterioration of the mechanical properties of the carbon fiber-reinforced composite material. A more preferred range of the degree of circularity of a single fiber is 0.75 to 0.88, and an even more preferred range of the degree of circularity of a single fiber is 0.8 to 0.86. Here, the degree of circularity is a value determined by the following Formula (4), and S and L are the cross-sectional area and the circumferential length of a single fiber, respectively, which are obtainable by performing an image analysis by SEM observation of a cross-section perpendicular to the fiber axis of the single fiber.

$$\text{Degree of circularity} = 4\pi S/L^2 \qquad (4)$$

The maximum Feret's diameter of a single fiber of the carbon fiber that constitutes the carbon fiber bundle used in the present invention is preferably 8 μm to 20 μm. When the maximum Feret's diameter is adjusted to 8 μm or more, each single fiber has high flexural rigidity, and since there occurs less entanglement of single fibers caused by disturbances in the prepreg production process, the number of interlacing points of single fibers in a fiber bundle is decreased. Furthermore, when the number of interlacing points of single fibers in the fiber bundle is decreased, and the maximum Feret's diameter of the single fiber is large, the carbon fiber bundle can be easily spread even if the number of fibers is large, and it is preferable. However, when the thickness of a single fiber of the carbon fiber is large, the existence probability of defects increases proportionally to the increase in the volume per unit length of the single fiber, and the strength of the carbon fiber is decreased. From the viewpoint of not decreasing the strength of the carbon fiber, the maximum Feret's diameter is preferably 20 μm or less. A more preferred range of the maximum Feret's diameter of the single fiber is 9 μm to 17 μm, and even more preferably 10 μm to 15 μm.

The value obtained by dividing the minimum Feret's diameter of a single fiber of the carbon fiber that constitutes the carbon fiber bundle used in the present invention by the maximum Feret's diameter, is preferably 0.40 to 0.75. As the value obtained by dividing the minimum Feret's diameter of the single fiber by the maximum Feret's diameter approaches closer to 1, the single fibers are more likely to adopt a closest packed structure, and when a carbon fiber thermoplastic resin prepreg is produced, there is a problem that dispersion of the carbon fibers and impregnation of the thermoplastic resin are not feasible. However, if the value is 0.75 or less, dispersion of the carbon fibers and impregnation of the thermoplastic resin are facilitated. Furthermore, if the value obtained by dividing the minimum Feret's diameter of the single fiber by the maximum Feret's diameter is extremely small, micromeandering of the fibers in the carbon fiber-reinforced composite material becomes noticeable as a result of local stress concentration in the single fibers, and the mechanical properties of the carbon fiber-reinforced composite material are deteriorated; however, if the value is 0.40 or more, the mechanical properties of the carbon fiber-reinforced composite material are satisfactory. A more preferred value obtained by dividing the minimum Feret's diameter of the single fiber by the maximum Feret's diameter is 0.50 to 0.70, and an even more preferred value is 0.55 to 0.65.

Meanwhile, the maximum Feret's diameter and the minimum Feret's diameter of a single fiber are obtained by an image analysis by performing an image analysis by an optical microscopic observation and a SEM observation of a cross-section perpendicular to the fiber axis of the single fiber.

The single fiber of the carbon fiber that constitutes the carbon fiber bundle used in the present invention is preferably such that when a cross-section perpendicular to the fiber longitudinal direction is subjected to a mirror surface finishing, and then observed by SEM, bright-and-dark stripes are not observed (that is, the brightness is uniform), or the brightness is gradually darkening from the outer side toward the inner side as in FIG. 6A. Generally, a carbon fiber having a maximum Feret's diameter of a known single fiber of 7 μm or more is prone to have non-uniform carbonization spots generated in the cross-sectional direction, which originate from the firing operation of the carbon fibers, and these non-uniform carbonization spots are observed as stripes of brightness in SEM observation, as shown in FIG. 6B (that is, the areas where non-uniform carbonization spots have been generated are recognized as dark areas, and the areas where non-uniform carbonization spots are not generated are recognized as bright areas). It is preferable for the carbon fiber bundle used in the present invention to be composed of carbon fibers in which, when a cross-section perpendicular to the fiber longitudinal direction of the single fiber that constitutes the carbon fiber bundle is subjected to a mirror surface treatment and then observed by SEM, the brightness is uniform, or the brightness is gradually darkening from the outer side toward the inner side. Here, the phrase "brightness is uniform" implies a state in which, when the diameter direction of the fiber is taken on the horizontal axis of the chart, and the brightness of the image is taken on the vertical axis, there are no valleys on the chart; and the phrase "brightness is gradually darkening from the outer side toward the inner side" implies a state in which when the diameter direction of the fiber is taken on the horizontal axis of the chart, and the brightness of the image is taken on the vertical axis, there exist one or more valleys on the chart.

The strand strength of the PAN-based carbon fiber used in the present invention is preferably 3500 MPa or more from the viewpoint of obtaining high mechanical characteristics (for example, high strength) when the carbon fiber is used in a composite material.

Furthermore, the strand elastic modulus of the PAN-based carbon fiber used in the present invention is preferably 200 GPa or more from the viewpoint of obtaining high mechanical characteristics when the carbon fiber is used in a composite material.

There is no preferable upper limit of the strand strength, and higher strand strength is more preferred. Regarding the strand elastic modulus, any PAN-based carbon fiber having a strand elastic modulus of 200 GPa or more can be used appropriately depending on the applications. The strand strength and the strand elastic modulus of this PAN-based carbon fiber can be determined according to ASTM D4018, by measuring the tensile properties of an epoxy resin-impregnated strand.

The number of single fibers of the carbon fiber included in the carbon fiber bundle used in the present invention, that is, the number of filaments, is not particularly limited, and while one kind may be used alone, or two or more kinds may be used in combination, a preferred range of the number of filaments is 3000 to 60,000. On the occasion of producing a carbon fiber thermoplastic resin prepreg, when plural fiber bundles having a small number of filaments are pulled and arranged to adjust the weight per area of fibers, the pitch of the comb needed for the production process is decreased, and more efforts for arranging the fibers will be needed. However, by using carbon fiber bundles having a number of filaments of 3000 or more, a carbon fiber thermoplastic resin prepreg having satisfactory product quality may be easily obtained. On the other hand, when the number of filaments is 60,000 or less, satisfactory handleability is obtained, and fiber spreading can be achieved uniformly. A more preferred range of the number of filaments is 12,000 to 40,000, and an even more preferred range of the number of filaments is 20,000 to 30,000.

(Method for Producing PAN-Based Carbon Fiber)

The PAN-based carbon fiber used in the present invention can be produced using a known method, as long as the average single fiber fineness can be adjusted to the range of 1.0 dtex to 2.4 dtex. This PAN-based carbon fiber can be produced by, for example, a production method including the following steps:

(1) a step of heat treating a PAN-based carbon fiber precursor fiber obtainable by spinning a PAN-based polymer in an oxidative atmosphere (for example, an atmosphere in which oxygen is present, such as air), for example, at 200° C. to 300° C. (hereinafter, also referred to as "flame resistance treatment"), and thereby obtaining a flame resistant fiber; and (2) a step of heat treating the flame resistant fiber in an inert atmosphere (for example, nitrogen or argon), for example, at 1000° C. to 1500° C. (hereinafter, also referred to as "carbonization treatment"), and thereby obtaining a PAN-based carbon fiber.

Furthermore, this carbon fiber may also be subjected to a heat treatment in an inert atmosphere, for example, at 2000° C. to 3000° C. (hereinafter, also referred to as "graphitization treatment"), and thus a carbon fiber having a high tensile modulus (graphitized fiber) can be produced. Incidentally, the PAN-based carbon fiber used in the present invention may be a fiber obtained by a carbonization treatment (hereinafter, also referred to as "carbon fiber"), or may be a fiber obtained by a graphitization treatment (hereinafter, also referred to as "graphitized fiber").

In the present invention, a PAN-based carbon fiber bundle can be produced performing a flame resistance treatment, a carbonization treatment or the like on the fiber in the form of a fiber bundle when a PAN-based polymer is spun out.

Furthermore, the number of single fibers that constitute the fiber bundle does not vary through these treatments (various steps).

(PAN-Based Polymer)

The PAN-based polymer (that is, a polyacrylonitrile-based polymer) that serves as a raw material of the PAN-based carbon fiber may be any polymer that contains a configuration derived from acrylonitrile in the molecular structure (hereinafter, referred to as "acrylonitrile unit"), and satisfies the average single fiber fineness described above when produced into a carbon fiber, and any polymer known in the field of carbon fibers can be used. That is, this PAN-based polymer may contain a constituent unit derived from another monomer (for example, acrylic acid, methacrylic acid, or acrylamide) as long as an acrylonitrile unit is contained, and the percentage content of the acrylonitrile unit in the PAN-based polymer is not particularly limited. Furthermore, the polymerization method for obtaining the PAN-based polymer is also not particularly limited, and for example, solution polymerization or suspension polymerization can be used.

(PAN-Based Carbon Fiber Precursor Fiber)

The PAN-based carbon fiber precursor fiber that serves as the precursor of the PAN-based carbon fiber used in the present invention can be obtained from the PAN-based polymer described above as a raw material according to, for example, the following spinning method.

First, a spinning dope prepared by dissolving the PAN-based polymer in a solvent is discharged into a coagulation bath to thereby produce a coagulated thread, and this coagulated thread is collected from the coagulation bath at a speed of, for example, 0.3 to 0.4 times the linear velocity of discharge of the spinning dope.

The solvent for dissolving the PAN-based polymer is not particularly limited as long as the solvent can dissolve this polymer; however, for example, an organic solvent such as dimethylacetamide, dimethyl sulfoxide or dimethylformamide; or an aqueous solution of an inorganic compound such as zinc chloride or sodium thiocyanate can be used. Furthermore, the concentration of the PAN-based polymer in the spinning dope can be adjusted to, for example, 10% to 35% by mass, relative to the total mass of the spinning dope.

Furthermore, for the coagulation bath, for example, an aqueous solvent solution in which the concentration of the solvent used in the spinning dope (for example, dimethylacetamide) is 50% to 70% by mass relative to the total mass of the coagulation bath, at a temperature of 30° C. to 50° C. can be used.

Next, the coagulated thread (hereinafter, also referred to as "swollen yarn") obtained as described above is washed and stretched. There are no particular limitations on the method of washing, but a method of immersing in water (particularly, in warm water), which is generally used, is desirable. Examples of the method for stretching include a method of stretching while immersing in water or in warm water; a method of dry hot stretching in air using a hot plate, a roller or the like; and stretching in a box type furnace in which hot air is circulated; however, the stretching method is not limited to these. Among them, from the viewpoint of economic efficiency, it is preferable to perform stretching in warm water. The temperature of the warm water is preferably from 40° C. to 80° C. The stretch ratio is preferably set to 1.1 to 7.0 times. However, since it is preferable to set the total stretch ratio to 5 to 9 times, in the case of performing secondary stretching later (that is, in the case of performing stretching in two divided occasions), it is preferable to set the stretch ratio in consideration of the stretch ratio for the secondary stretching. Here, the stretch ratio means the ratio of velocities before and after stretching (velocity after stretching/velocity before stretching). In regard to the order of washing and stretching as described above, washing may be carried out first, or the two may be carried out simultaneously. Furthermore, an oil agent adhesion treatment, a drying treatment or the like can be carried out after the washing and stretching. Thus, a PAN-based carbon fiber precursor fiber can be obtained.

It is preferable that this PAN-based carbon fiber precursor fiber do not contain impurities, internal voids, or surface defects such as crazes and cracks, from the viewpoint of obtaining high strand strength or high mechanical characteristics of a carbon fiber composite material (molded article). Subsequently, the precursor fiber thus obtained is subjected to a flame resistance treatment and a carbonization treatment, and the specific treatment conditions (for example, treatment temperature or treatment time) can be appropriately set to the extent that a PAN-based carbon fiber satisfying the above-described fiber fineness may be obtained.

The carbon fiber bundle used in the present invention is preferably subjected to a surface treatment. The surface treatment may be carried out by a known technique, but for example, the affinity and adhesion between the carbon fibers and the matrix resin on the occasion of being fabricated into a carbon fiber composite material can be enhanced by performing an electrolytic oxidation treatment in an electrolyte liquid, or by performing an oxidation treatment in the gas phase or in the liquid phase. Regarding the extent of the surface treatment, the iPa value that can be determined by an electrochemical analysis method (cyclic voltammetry) is preferably in the range of 0.05 $\mu A/cm^2$ to 0.6 $\mu A/cm^2$. This iPa value is affected by the amount of oxygen-containing functional groups in the carbon fiber, the degree of surface asperities involved in the formation of an electric double layer, and the microstructure. Particularly, in the case of forming an interlayer compound in which carbon fibers that have been extensively etched on the surface, or anionic ions have penetrated between the layers of graphite crystals, the iPa value has a large value. It is understood that in a composite material exhibiting excellent mechanical performance, the interface between the carbon fibers and the resin is important, and in particular, a carbon fiber having a surface on which appropriate polar functional groups are present, and a small electric double layer is formed, forms an optimal interface. When the iPa value is 0.05 $\mu A/cm^2$ or more, the amount of the polar functional groups introduced is sufficient, and excellent interfacial adhesiveness is exhibited. On the other hand, when the iPa value is 0.5 $\mu A/cm^2$ or less, excessive surface edging or the formation of interlayer compounds is suppressed, and satisfactory interfacial adhesiveness is obtained. A more preferred range of the iPa value is 0.06 $\mu A/cm^2$ to 0.3 $\mu A/cm^2$, and an even more preferred range of the iPa value is 0.07 $\mu A/cm^2$ to 0.15 $\mu A/cm^2$.

Furthermore, in regard to the carbon fiber bundle used in the present invention, the amount of oxygen-containing groups at the carbon fiber surface (O1S/C1S) that can be determined by X-ray photoelectron spectroscopy, is preferably in the range of 0.03 to 0.5. A more preferred range of the amount of oxygen-containing groups at the carbon fiber surface (O1S/C1S) is 0.04 to 0.10. Also, in regard to the carbon fiber bundle (A) used in the present invention, the amount of nitrogen-containing functional groups at the carbon fiber surface (N1S/C1S) that can be determined by X-ray photoelectron spectroscopy is preferably in the range of 0.02 to 0.08. A more preferred range of the amount of nitrogen-containing functional groups at the carbon fiber surface (N1S/C1S) is 0.03 to 0.06.

Furthermore, in the present invention, a sizing agent is attached to the PAN-based carbon fiber thus obtained to produce a sizing agent-containing PAN-based carbon fiber, and then the carbon fiber thermoplastic resin prepreg of the present invention may be produced from this sizing agent-containing PAN-based carbon fiber and the thermoplastic resin described above. Meanwhile, this sizing agent can be appropriately selected from those sizing agents known in the field of carbon fibers and used; however, specific examples thereof include an epoxy resin, an epoxy-modified polyurethane resin, a polyolefin resin, an acid-modified polyolefin resin, a polyester resin, a phenolic resin, a polyamide resin, a polyurethane resin, a polycarbonate resin, a polyether imide resin, a polyamideimide resin, a polyimide resin, a bismaleimide resin, a urethane-modified epoxy resin, a polyvinyl alcohol resin, a polyvinylpyrrolidone resin, a polyether sulfone resin, and a polyhydroxy compound. Examples of preferred kinds of the sizing agent include an epoxy resin, a polyolefin resin, an acid-modified polyolefin resin, and a polyhydroxy compound. Furthermore, it is preferable to use a sizing agent having satisfactory wettability to the thermoplastic resin used and having a smaller contact angle. Specifically, it is preferable to appropriately select the sizing agent in accordance with the matrix resin.

The amount of attachment of the sizing agent is preferably 0.3% by mass or more relative to the total mass of the PAN-based carbon fiber from the viewpoints of reforming of the carbon fiber surface and chemical modification; and preferably 5.0% by mass or less from the viewpoints of impregnability and handleability. The amount of attachment is more preferably 0.4% by mass or more from the viewpoints of bundling properties and prevention of fluff generation, and more preferably 3.0% by mass or less from the viewpoint of impregnability of highly viscous resins. Furthermore, from the viewpoint of sufficiently imparting a desired function to the carbon fiber bundle, the amount of attachment of the sizing agent is preferably 0.1% to 20% by mass. When the amount of attachment of the sizing agent is adjusted to 0.1% by mass or more, a desired function can be sufficiently imparted to the carbon fiber bundle. Furthermore, when the amount of attachment of the sizing agent is adjusted to 20% by mass or more, impregnation of the matrix resin in the carbon fiber at the time of producing a carbon fiber thermoplastic resin prepreg is facilitated. A preferred range of the amount of attachment of the sizing agent is 0.2% to 2.0% by mass, and a more preferred range of the amount of attachment of the sizing agent is 0.3% to 0.6% by mass. Meanwhile, the amount of attachment (mass %) of this sizing agent is expressed in percentage of the mass of the sizing agent with respect to the mass of the PAN-based carbon fiber to which the sizing agent is attached (after attachment of the sizing agent).

A single fiber of the carbon fiber that constitutes the carbon fiber bundle that can be used in the present invention is preferably such that the single fiber has plural surface asperity structures extending over 2 µm or more in the fiber longitudinal direction, and the difference of elevation between the peak and the bottom (Rp-v) in a region having a circumferential length of the single fiber of 2000 nm×a length in the fiber axial direction of 2000 nm is in the range of 30 nm to 200 nm. When the difference of elevation (Rp-v) is 30 nm or more, satisfactory interfacial adhesive strength between the carbon fibers and the thermoplastic resin is exhibited by an anchor effect, and excellent mechanical properties are exhibited when a carbon fiber composite material is produced. On the other hand, if the difference of elevation (Rp-v) is extremely large, that is, if the surface smoothness of the single fiber surface is extremely low, there is a problem that when a carbon fiber composite material is produced, stress is concentrated at the interfacial asperities between less tough carbon fibers and a thermoplastic resin, and the carbon fiber composite material is destroyed. However, when the difference of elevation (Rp-v) is 200 nm or less, stress concentration at the interfacial surface asperities can be prevented, and the carbon fiber composite material acquires excellent mechanical properties. A preferred range of the difference of elevation (Rp-v) is 45 nm to 150 nm, and a more preferred range is 60 nm to 125 nm.

A single fiber of the carbon fiber that constitutes the carbon fiber bundle that can be used in the present invention preferably has plural surface asperity structures extending over 2 µm or more in the fiber longitudinal direction, and has an average degree of surface asperities Ra of 5 nm to 35 nm in a region having a circumferential length of the single fiber of 2000 nm×a length in the fiber axial direction of 2000 nm. When the average degree of surface asperities Ra is 5 nm or more, satisfactory interfacial adhesive strength between the carbon fibers and the thermoplastic resin is exhibited by an anchor effect, and when a carbon fiber composite material is produced, excellent mechanical properties are obtained. On the other hand, if the average degree of surface asperities Ra is extremely large, that is, if the surface smoothness of the single fiber surface is extremely low, there is a problem that when a carbon fiber composite material is produced, stress is concentrated at the interfacial asperities between less tough carbon fibers and a thermoplastic resin, and the carbon fiber composite material is destroyed. However, when the average degree of surface asperities Ra is 35 nm or less, stress concentration at the interfacial surface asperities can be prevented, and the carbon fiber composite material acquires excellent mechanical properties. A preferred range of the average degree of surface asperities Ra is 10 nm to 30 nm, and a more preferred range is 15 nm to 25 nm.

A single fiber of the carbon fiber that constitutes the carbon fiber bundle that can be used in the present invention preferably has plural surface asperity structures extending over 2 µm or more in the fiber longitudinal direction, and has a number of surface asperities Rn per a circumferential length of the single fiber of 2 µm of 5 to 30 times/2 µm. When Rn is 5 times/2 µm or more, satisfactory interfacial adhesive strength between the carbon fibers and the thermoplastic resin is exhibited by an anchor effect, and when a carbon fiber composite material is produced, excellent mechanical properties are obtained. On the other hand, if Rn is extremely large, that is, in a case in which the surface smoothness of the single fiber surface is extremely low, when a carbon fiber composite material is produced, there is a problem that stress is concentrated at the interfacial asperities between less tough carbon fibers and a thermoplastic resin, and the carbon fiber composite material is destroyed. When Rn is 30 times/2 µm or less, stress concentration at the interfacial asperities can be prevented, and the carbon fiber composite material has excellent mechanical properties. A preferred range of Rn is 7 to 25 times/2 µm, and more preferably 10 to 20 times/2 µm. Meanwhile, the difference of elevation (Rp-v), Ra and Rn can be obtained by scanning the surface of a single fiber using a scanning atomic force microscope.

The carbon fiber bundle that can be used in the present invention preferably has a strand tensile strength of 306 kgf/mm$^2$ (3000 MPa) or more. If the strand strength is markedly low, the carbon fiber bundle becomes unusable in most of the fields where carbon fibers are currently used, such as structural materials; however, if the strand tensile strength is 306 kgf/mm² (3000 MPa) or more, the carbon fiber bundle is applicable as a structural material. The strand tensile strength is preferably 357 kgf/mm² (3500 MPa) or more, and more preferably 408 kgf/mm² (4000 MPa) or more. On the other hand, if the strand tensile strength is extremely high, when the carbon fiber bundle is produced into a carbon fiber composite material, there is a problem that stress is concentrated on the compression side in a bending test, compression failure occurs noticeably, and the flexural strength is decreased. However, when the strand tensile strength is 551 kgf/mm² (5400 MPa) or less, the balance between the tensile strength and the compressive strength is appropriate, and the flexural strength is excellent when the carbon fiber bundle is produced into a carbon fiber composite material. The strand tensile strength is preferably 509.9 kgf/mm² (5000 MPa) or less, and more preferably 479.3 kgf/mm² (4700 MPa) or less.

The carbon fiber bundle that can be used in the present invention preferably has a strand tensile modulus of 20.4 tonf/mm² (200 GPa) or more. When the tensile modulus is markedly low, the carbon fiber bundle becomes unusable in most of the fields where carbon fibers are currently used, such as structural materials; however, if the strand tensile modulus is 20.4 tonf/mm² (200 GPa) or more, the carbon fiber bundle is applicable as a structural material. The strand tensile modulus is preferably 21.4 tonf/mm² (210 GPa) or more, and more preferably 22.4 tonf/mm² (220 GPa) or more. The strand strength and the strand elastic modulus can be measured according to JIS R7601 (1986).

<Method for Producing Carbon Fiber Thermoplastic Resin Prepreg>

Regarding the method for producing a carbon fiber thermoplastic resin prepreg according to the second embodiment of the present invention, there are no particular limitations as long as the method is after all a method capable of obtaining a carbon fiber prepreg having a structure in which the PAN-based carbon fiber bundle described above is impregnated with the thermoplastic resin described above, and a known method can be appropriately used. Specifically, for example, the following methods can be used.

a) A method of impregnating the PAN-based carbon fiber bundle used in the present invention with a thermoplastic resin that has been heated to melt (molten resin) using an extruder.

b) A method of dispersing a powdered thermoplastic resin together in the interior and the exterior of a sheet formed from a large number of single fibers of a PAN-based carbon fiber, and then melting the powdered thermoplastic resin.

c) A method of fabricating a thermoplastic resin into a film, and repeatedly heating and compressing the film with a sheet formed from a large number of single fibers of a PAN-based carbon fiber.

d) A method of dissolving a thermoplastic resin in a solvent, impregnating a PAN-based carbon fiber bundle in a solution state, and then volatilizing the solvent.

e) A method of fabricating a thermoplastic resin into fibers, forming a mixed yarn of the fibrous thermoplastic resin and a PAN-based carbon fiber, and then heating the mixed yarn to melt the fibers of the thermoplastic resin.

f) A method of impregnating a PAN-based carbon fiber bundle with a monomer for forming a thermoplastic resin, and then polymerizing the monomer to form a polymer (thermoplastic resin).

The method a has an advantage that it is not necessary to process a thermoplastic resin; however, it may be difficult to produce a stabilized prepreg. Furthermore, the method b has an advantage that the thermoplastic resin can be easily impregnated; however, it may be difficult to disperse a powder uniformly in a sheet. The method c needs to process a thermoplastic resin into a film; however, as described above, a thermoplastic resin having excellent mechanical characteristics can be relatively easily fabricated into a film, and a prepreg having a relatively satisfactory quality can be produced easily. Furthermore, the method d is such that there is a high possibility that the solvent may remain within the thermoplastic resin of a prepreg, and it may be necessary to use a solvent for which handling is dangerous. The method e requires a step of fabricating a thermoplastic resin into a fiber, and a step of producing a mixed yarn of the thermoplastic resin fiber with a PAN-based carbon fiber, and the number of steps is increased. In the method f, it is difficult in many cases to carry out the method in an environment in which polymerization is performed after a PAN-based carbon fiber bundle is impregnated with a monomer for forming a thermoplastic resin, and thus it is not inexpensive.

As discussed above, it is particularly preferable to produce the carbon fiber thermoplastic resin prepreg of the present invention using the method c of laminating a thermoplastic resin fabricated into a film, with a sheet formed from a large number of single fibers of a PAN-based carbon fiber.

The method c of laminating a thermoplastic resin fabricated into a film, with a sheet formed from a large number of single fibers of a PAN-based carbon fiber, is specifically a method of heating and dissolving a resin by a known method, and adhering, while heating, the molten resin on both surfaces or one surface of a unidirectionally arranged carbon fiber sheet. The thickness of the film is determined by the weight per area (g/m²) or the percentage content of the carbon fiber sheet, but the thickness is preferably 10 μm to 100 μm. Regarding the production conditions, a prepreg can be produced by applying pressure in a heating zone which has been heated to a temperature higher than or equal to the melting point or the softening point of the resin in the film form, impregnating the resin, and solidifying the resin at a temperature lower than or equal to the melting point or the softening point of the resin. The method for applying pressure is generally carried out by applying pressure in a roll or the like or in a plane or the like. The pressure at the time of heating and cooling is preferably 100 kPa to 2000 kPa.

Meanwhile, for the method of melting a thermoplastic resin by heating, and impregnating a PAN-based carbon fiber bundle therewith as in the case of the methods b, c and e, hot pressing and cold pressing can be used in combination, so that it is also acceptable to melt and impregnate a thermoplastic resin into a PAN-based carbon fiber bundle, and then solidify a prepreg. Furthermore, an intermittent press or a double belt press can also be used, so that it is also acceptable to provide a heating zone and a cooling zone, melt and impregnate a thermoplastic resin into a PAN-based carbon fiber bundle, and then solidify a prepreg. The method of combining hot pressing and cold pressing facilitates lengthening of the time for impregnating the resin, and it is easy to obtain a satisfactory impregnated state. The method of using a double belt press can perform production continuously, and therefore, productivity is excellent.

<Carbon Fiber Thermoplastic Resin Prepreg Flakes>

The carbon fiber thermoplastic resin prepreg of the fourth embodiment of the present invention can be used as the carbon fiber thermoplastic resin prepreg flakes of the fifth embodiment of the present invention. The carbon fiber thermoplastic resin prepreg flakes can be obtained by cutting a carbon fiber thermoplastic resin prepreg. The carbon fiber thermoplastic resin prepreg according to the present invention can be cut by a known technique. Examples include a technique of using a cutting plotter, and a technique of using a slitter and a rotary cutter in combination.

There are no particular limitations on the width or length of the carbon fiber thermoplastic resin prepreg flakes; however, the width is preferably 1 mm to 50 mm, the length is preferably 6 mm to 50 mm, and the thickness is preferably 0.1 mm to 0.5 mm.

<Carbon Fiber-Reinforced Composite Material>

The carbon fiber-reinforced composite materials of the third and sixth embodiments of the present invention are obtained by heating the carbon fiber thermoplastic resin prepreg and/or the carbon fiber thermoplastic resin prepreg flakes, and then cooling the prepreg flakes under pressure. The heating temperature for the heating treatment is preferably 150° C. to 320° C., and the heating time is preferably 1 minute to 10 minutes. The temperature for the cooling under pressure is 15° C. to 130° C., and the pressure is preferably 100 kPa to 2000 kPa.

The carbon fiber composite material of the present invention uses the carbon fiber prepreg and/or carbon fiber thermoplastic resin prepreg flakes of the present invention described above. This form of carbon fiber composite material can be appropriately set according to the use thereof (for example, applications related to aeronautics, sports, leisure and the like). A specific example of the carbon fiber composite material is a composite panel obtainable by autoclave molding in which carbon fiber prepregs are laminated and bagged, subsequently the material is molded or by stamping molding in which carbon fiber prepregs are laminated and heated with an IR heater, and then cold pressing is carried out.

Furthermore, for the carbon fiber composite material of the present invention, a tape-shaped woven fabric or a knitted fabric produced by slitting the carbon fiber thermoplastic resin prepreg of the present invention in parallel with the fiber axial direction at a predetermined width, can also be used. In addition, for the carbon fiber composite material of the present invention, a random sheet in which small flakes produced by cutting the carbon fiber thermoplastic resin prepreg of the present invention to a predetermined size are randomly dispersed, and press molded products thereof can also be used.

The volume percentage content (Vf) of the PAN-based carbon fiber in a carbon fiber composite material produced using the carbon fiber thermoplastic resin prepreg of the present invention is preferably from 30% by volume to 60% by volume relative to the total volume of the carbon fiber composite material. When the percentage content of the PAN-based carbon fiber is 30% by volume or more, a composite material having high mechanical characteristics can be obtained, and when the percentage content is 60% by volume or less, a composite material having fewer voids can be obtained.

Furthermore, for the same reasons, the volume percentage content of the matrix resin(thermoplastic resin) in a carbon fiber composite material produced using the carbon fiber thermoplastic resin prepreg of the present invention is preferably from 40% by volume to 70% by volume relative to the total volume of the carbon fiber composite material.

Meanwhile, the volume percentage contents of the PAN-based carbon fiber and the thermoplastic resin in this carbon fiber composite material can be characterized by the method according to SACMA SRM 10R-94.

A smaller coefficient of variation for the volume percentage content (Vf) of the PAN-based carbon fiber in the carbon fiber composite material is preferred. If the coefficient of variation is small, when stress is applied to the carbon fiber composite material, stress is dispersed evenly, and therefore, high mechanical characteristic are obtained.

A carbon fiber composite material produced using the carbon fiber thermoplastic resin prepreg of the present invention can have higher 0°-flexural strength relative to conventional molded products, due to the characteristics of the PAN-based carbon fiber and the thermoplastic resin used.

The carbon fiber-reinforced composite material of the present invention is preferably such that when a cross-section parallel to the thickness direction represented by (thickness)×(width of 1 mm) of the carbon fiber-reinforced composite material is designated as Sa (unit: mm$^2$), the volume percentage content of the thermoplastic resin obtainable from an image of the cross-section is designated as Vr (unit: volume %), and the total area of a region (resin region) occupied by numerous line segments that are parallel to the thickness direction of the carbon fiber-reinforced composite material that can be drawn on the cross-section (plane) and do not pass through a cross-section of a carbon fiber over 15 μm or more (that is, the value obtained by integrating numerous line segments that are parallel to the thickness direction of the carbon fiber-reinforced composite material and do not pass through a cross-section of a carbon fiber over 15 μm or more) is designated as St (unit: mm$^2$), the value of the following Formula (6) is 0.40 or less:

$$St/(Sa \times Vr) \quad (6)$$

The carbon fiber-reinforced composite material of the present invention is preferably such that in a cross-sectional area that is parallel to the thickness direction represented by (thickness)×(width of 1 mm) of the carbon fiber-reinforced composite material, when the thickness of the resin region is designated as Tt (unit: mm), and the thickness of a region other than the resin region between mutually independent resin regions existing adjacently on one straight line that is parallel to the thickness direction of the carbon fiber-reinforced composite material (hereinafter, also referred to as "fiber-reinforced region") is designated as Tf (unit: mm), the ratio of the maximum value of Tt, max(Tt), and the average value of Tf, ave(Tf), that is, the value of the following Formula (7) is 1.0 or less.

The thickness of a resin region and the thickness of a region other than the region as used herein both refer to the thicknesses in a direction parallel to the thickness of the carbon fiber-reinforced composite material.

$$\mathrm{Max}(Tt)/\mathrm{ave}(Tf) \quad (7)$$

When the value of Formula (6) and the value of Formula (7) are large, that is, if the dispersion of carbon fibers in the carbon fiber composite material is poor, there is a problem that the strength of the carbon fiber composite material is decreased. However, the value of Formula (6) is 0.40 or less, and the value of Formula (7) is 1.0 or less, stress can be appropriately dispersed in the carbon fiber composite material, and the carbon fiber composite material have excellent mechanical properties. A more preferred value of (6) is 0.25 or less, and an even more preferred value is 0.20 or less. A more preferred value of Formula (7) is 0.8 or less, and an even more preferred value is 0.6 or less.

The cross-sectional area Sa (unit: mm²) that is parallel to the thickness direction represented by (thickness)×(width of 1 mm) of the carbon fiber-reinforced composite material described above, the total area St of a resin region, the thickness Tt of the resin region, and the thickness Tf of a fiber-reinforced region can be determined by an image analysis of images obtained by mirror-surface polishing a cross-section parallel to the thickness direction of the carbon fiber composite material, and then performing observation with an optical microscope or observation by SEM.

The thickness Tt of the resin region observed in a cross-section of a carbon fiber-reinforced composite material is always 15 μm or more by definition. Tt at a position at which a resin region has two or more non-overlapping line segments that are 15 μm or more in length and exist on a single straight line that is parallel to the thickness direction of the carbon fiber-reinforced composite material, is defined as the sum of the lengths of all line segments of non-overlapping segments that are 15 μm or more in length and exist on that single straight line.

Regarding the thickness Tf of the fiber-reinforced region observed in a cross-section of a carbon fiber-reinforced composite material, the thickness of the carbon fiber composite material is the upper limit according to the definition described above; however, if the thickness of the prepreg used in the production of the carbon fiber composite material is already known, the thickness of the prepreg is defined as the upper limit. Even in a case in which one fiber-reinforced region has two or more non-overlapping line segments on a single straight line that is parallel to the thickness direction of the carbon fiber-reinforced composite material, Tf represents the length of each line segment and employs a value less than or equal to the upper limit described above. Thus, the length of a fiber-reinforced region in a direction perpendicular to the thickness direction, which is used to calculate the ave(Tf), is obtained by repeating integration for the number of the line segments. That is, ave(Tf) is a value obtained by dividing the "integrated value of Tf", by the "sum of the lengths of fiber-reinforced regions in a direction perpendicular to the thickness direction obtained by repeating integration for the number of Tf".

<Automobile Parts>

The automobile part according to the seventh embodiment of the present invention in which the carbon fiber composite material according to the sixth embodiment of the present invention is preferably used, is composed partially or entirely of the carbon fiber-reinforced composite material of the present invention.

EXAMPLES

Hereinafter, the present invention will be described specifically by way of Examples, but the present invention is not intended to be limited by these Examples.

In the following Examples and Comparative Examples, materials described below were used as the raw materials.

(PAN-Based Carbon Fiber: CF)

PAN-based carbon fiber 1 (CF1) (average single fiber fineness: 1.2 dtex, strand strength: 4218 MPa, strand elastic modulus: 236 GPa)

PAN-based carbon fiber 2 (CF2) (average single fiber fineness: 2.4 dtex, strand strength: 3477 MPa, strand elastic modulus: 230 Pa)

PAN-based carbon fiber 3 (CF3) (manufactured by Mitsubishi Rayon Co., Ltd., trade name: TR50S, average single fiber fineness: 0.67 dtex, strand strength: 4900 MPa, strand elastic modulus: 240 GPa)

PAN-based carbon fiber 4 (CF4) (average single fiber fineness: 1.4 dtex, degree of circularity: 0.82, number of filaments: 24,000, strand strength: 435.9 kgf/mm² (4274 MPa), strand elastic modulus: 23.5 tonf/mm² (230 GPa), maximum Feret's diameter: 12.8 μm, kind of sizing agent: epoxy resin, amount of attachment of sizing agent: 0.4% by mass)

PAN-based carbon fiber 5 (CF5) (average single fiber fineness: 1.4 dtex, degree of circularity: 0.82, number of filaments: 28,000, strand strength: 414 kgf/mm² (4059 MPa), strand elastic modulus: 24.5 tonf/mm² (240 GPa), maximum Feret's diameter: 12.8 μm, kind of sizing agent: epoxy resin, amount of attachment of sizing agent: 1.2% by mass)

PAN-based carbon fiber 6 (CF6) (average single fiber fineness: 2.4 dtex, degree of circularity: 0.83, number of filaments: 12,000, strand strength: 367 kgf/mm² (3598 Mpa), strand elastic modulus: 23.7 tonf/mm² (232 GPa), maximum Feret's diameter: 16.4 μm, kind of sizing agent: epoxy resin, amount of attachment of sizing agent: 1.2% by mass)

PAN-based carbon fiber 7 (CF7) (average single fiber fineness: 1.2 dtex, degree of circularity: 0.75, number of filaments: 24,000, strand strength: 431 kgf/mm² (4225 MPa), strand elastic modulus: 23.4 tonf/mm² (229 GPa), maximum Feret's diameter: 11.9 μm, kind of sizing agent: epoxy resin, amount of attachment of sizing agent: 1.2% by mass)

PAN-based carbon fiber 8 (CF8) (average single fiber fineness: 2.0 dtex, degree of circularity: 0.83, number of filaments: 12,000, strand strength: 356 kgf/mm² (3490 MPa), strand elastic modulus: 25.1 tonf/mm² (246 GPa), maximum Feret's diameter: 15.6 μm, kind of sizing agent: epoxy resin, amount of attachment of sizing agent: 1.2% by mass)

PAN-based carbon fiber 9 (CF9) (manufactured by Mitsubishi Rayon Co., Ltd., product name: PYROFIL (registered trademark) TR50S 15 L AD, average single fiber fineness: 0.7 dtex, degree of circularity: 0.95, number of filaments: 15,000, strand strength: 500 kgf/mm² (4900 MPa), strand elastic modulus: 24.5 tonf/mm² (240 GPa), maximum Feret's diameter: 7.5 μm, kind of sizing agent: epoxy resin, amount of attachment of sizing agent: 0.4% by mass)

PAN-based carbon fiber 10 (CF10) (manufactured by Mitsubishi Rayon Co., Ltd., product name: PYROFIL (registered trademark) TR50S 12 L AL, average single fiber fineness: 0.7 dtex, degree of circularity: 0.95, number of filaments: 12,000, strand strength: 500 kgf/mm² (4900 MPa), strand elastic modulus: 24.5 tonf/mm² (240 GPa), maximum Ferefs diameter: 7.5 μm, kind of sizing agent: epoxy resin, amount of attachment of sizing agent: 1.2% by mass)

PAN-based carbon fiber 11 (CF11) (manufactured by Toray Industries, Inc., product name: TORAYCA (registered trademark) T700SC-12000 50C)

(Method for Producing PAN-Based Carbon Fiber 4)

A copolymer containing polyacrylonitrile as a main component and containing 2 mol % of 2-hydroxyethyl methacrylate was dissolved in dimethylacetamide, the solution was spun by a wet spinning method, and thus a carbon fiber precursor having an average single fiber fineness of 2.5 dtex and a total number of filaments of 24,000 was obtained. Subsequently, the carbon fiber precursor was subjected to a flame resistance treatment by oxidizing with air for 60 minutes in a hot air circulating type flame resistance furnace at 250° C. to 290° C.; to a carbonization treatment in a high temperature heat treatment furnace at 660° C. for 90 seconds and at 1350° C. for 90 seconds in a nitrogen atmosphere; to a surface oxidation treatment in an electrolyte liquid; and then to a sizing treatment using an epoxy resin as a sizing agent such that the amount of attachment thereof would be 0.4% by mass. Thus, a PAN-based carbon fiber 4 was obtained.

(Method for Producing PAN-Based Carbon Fiber 5)

A PAN-based carbon fiber 5 was obtained in the same manner as in the method for producing the PAN-based carbon fiber 4, except that the total number of filaments of the carbon fiber precursor was changed to 28,000, and the amount of attachment of sizing agent was changed to 1.2% by mass.

(Method for Producing PAN-Based Carbon Fiber 6)

A PAN-based carbon fiber 6 was obtained in the same manner as in the method for producing the PAN-based carbon fiber 5, except that the average single fiber fineness of the carbon fiber precursor was changed to 4.5 dtex, and the total number of filaments was changed to 12,000.

(Method for Producing PAN-Based Carbon Fiber 7)

A copolymer containing polyacrylonitrile as a main component and containing 2 mol % of 2-hydroxyethyl methacrylate was dissolved in dimethylacetamide, the solution was spun by a wet spinning method, and thus a carbon fiber precursor having an average single fiber fineness of 2.5 dtex and a total number of filaments of 24,000 was obtained. Subsequently, the carbon fiber precursor was subjected to a flame resistance treatment by oxidizing with air for 70 minutes in a hot air circulating type flame resistance furnace at 250° C. to 290° C.; to a carbonization treatment in a high temperature heat treatment furnace at 660° C. for 90 seconds and at 1350° C. for 90 seconds in a nitrogen atmosphere; to a surface oxidation treatment in an electrolyte liquid; and then to a sizing treatment using an epoxy resin as a sizing agent such that the amount of attachment thereof would be 1.2% by mass. Thus, a PAN-based carbon fiber 7 was obtained.

(Method for Producing PAN-Based Carbon Fiber 8)

A PAN-based carbon fiber 8 was obtained in the same manner as in the method for producing the PAN-based carbon fiber 7, except that the average single fiber fineness of the carbon fiber precursor was changed to 4.5 dtex, and the total number of filaments was changed to 12,000.

(Thermoplastic Resin Composition)

PMMA resin 1 (manufactured by Mitsubishi Rayon Co., Ltd., trade name: TF8, flexural modulus: 3300 MPa, flexural strength: 120 MPa)

PMMA resin 2 (manufactured by Mitsubishi Rayon Co., Ltd., trade name: TF9, flexural modulus: 3300 MPa, flexural strength: 95 MPa)

AS resin 1 (manufactured by UMG ABS, Ltd., trade name: AP-H, flexural modulus: 3520 MPa, flexural strength: 108 MPa)

AS resin 2 (manufactured by UMG ABS, Ltd., trade name: AP-F, flexural modulus: 3460 MPa, flexural strength: 69 MPa)

PA12 resin (manufactured by Arkema SA, trade name: AMN-O-TLD, flexural modulus: 1100 MPa, flexural strength: 47 MPa)

Thermoplastic Resin Composition

Modified polypropylene (manufactured by Mitsubishi Chemical Corp., product name: MODIC (registered trademark) P958)

Polyamide 6 (manufactured by Ube Industries, Ltd., product name: UBE NYLON 1013B)

Polyamide 610 (manufactured by Daicel-Evonik, Ltd., product name: VESTAMID® TERRA HS16)

Polycarbonate (manufactured by Mitsubishi Engineering Plastics Corp., product name: NOVAREX M7020)

<Measurement of Average Single Fiber Fineness of Carbon Fiber Bundle>

The average single fiber fineness is the weight per unit length of a single fiber. Two fiber bundles having a length of 1 m were collected from arbitrary sites of a carbon fiber bundle, and the mass of the respective bundles was measured. These values were respectively divided by the number of filaments and multiplied by 10,000, and the average value of the two fiber bundles was calculated. This was designated as the average single fiber fineness. The evaluation results are presented in Table 3.

<Measurement of Single Fiber Degree of Circularity and Feret's Diameter of Carbon Fiber Bundle, and Verification of Presence or Absence of Striped Pattern of Light and Dark of Cross-Section>

(Production of Sample)

A carbon fiber bundle cut to a length of 5 cm was embedded in an epoxy resin (EPOMOUNT main agent: EPOMOUNT curing agent=100:9 (mass ratio)), the carbon fiber bundle was cut at 2 cm to expose a transverse cross-section, and the cross-section was subjected to a mirror surface treatment.

(Etching Treatment of Observed Surface)

Furthermore, in order to clearly define the external appearance of the fiber, a transverse cross-section of a sample was subjected to an etching treatment under the conditions described below.

Apparatus: Plasma etching apparatus (product name: JP-170) manufactured by JEOL, Ltd.

Atmosphere gas: $Ar/O_2=75/25$

Plasma output: 50 W

Degree of vacuum: about 120 Pa

Processing time: 5 min (SEM Observation)

A transverse cross-section of a sample that had been subjected to an etching treatment was observed by SEM (product name: FEI-WL20 manufactured by Philips N.V.), and five sheets of photographs in which five or more fiber cross-sections were shown in the screen were arbitrarily taken.

(Measurement of Degree of Circularity)

For each sample, arbitrary twenty single fiber cross-sections were selected from five sheets of SEM photographs, provided that three or more single fiber cross-sections were selected from one sheet of photograph. The external shapes of the fiber cross-sections were traced using an image analysis software (product name: IMAGE-PRO PLUS manufactured by Nippon Roper K.K.), and the circumferential length L and the area S of each fiber cross-section were measured. Thus, the average value of the values obtained by formula: $(4\pi S/L^2)$ was designated as degree of circularity. The evaluation results are presented in Table 3.

(Measurement of Feret's Diameter)

For each sample, arbitrary twenty single fiber cross-sections were selected from five sheets of SEM photographs, provided that three or more single fiber cross-sections were selected from one sheet of photograph. The external shapes of the fiber cross-sections were traced using an image analysis software (product name: IMAGE-PRO PLUS manufactured by Nippon Roper K.K.), and the maximum Feret's diameter and the minimum Feret's diameter of each single fiber cross-section were measured. The evaluation results are presented in Table 3.

(Verification of Presence or Absence of Striped Pattern of Light and Dark in Cross-Section)

For each sample, the photographs thus taken were checked, and the presence or absence of striped patterns of light and dark were recorded. The evaluation results are presented in Table 3.

<Measurement of iPa of Carbon Fiber Bundle>

The iPa value was measured by the following method. The electrolyte liquid used was adjusted to pH 3 using a 5% aqueous solution of phosphoric acid, and nitrogen bubbling was carried out to exclude the influence of dissolved oxygen. A sample carbon fiber was immersed in an electrolyte liquid as one electrode, and a platinum electrode having a sufficient surface area was used as a counter electrode, while an Ag/AgCl electrode was used as a reference electrode. The sample was in the form of a 12000-filament tow having a length of 50 mm. The scan range of the potential applied between the carbon fiber electrode and the platinum electrode was set to −0.2 V to +0.8 V, and the scan rate was set to 2.0 mV/sec. A current-voltage curve was drawn using an X-Y recorder, and when the curve was stabilized by performing scanning three or more times, the current value i was read for an Ag/AgCl standard electrode by taking the potential at +0.4 V as the reference potential. Thus, iPa was calculated according to the following formula. The evaluation results are presented in Table 3.

$$iPa = 1 \; (\mu A)/\text{sample length (cm)} \times (4\pi \times \text{weight per area (g/cm)} \times \text{number of filaments/density (g/cm}^3))^{1/2}$$

The apparent surface area was calculated from the sample length, the sample density determined according to the method described in JIS R7601, and the weight per area, and the current value i was divided by the apparent surface area to obtain iPa. This measurement was carried out by employing a cyclic voltammetry analyzer (manufactured by Yanagimoto Seisakusho Co., Ltd., product name: P-1100 type).

<Measurement of Amount of Oxygen-Containing Functional Groups (O1S/CIS) and Nitrogen-Containing Functional Groups (N1S/CIS) According to X-Ray Photoelectron Spectroscopy>

X-ray photoelectron spectroscope: (manufactured by VG Scientific, Ltd., product name: ESCALAB, 220iXL)

Measurement method: A carbon fiber was mounted on a sample platform and fixed, and measurement was carried out by a conventional method.

The oxygen concentration was integrated over the range of 524 eV to 538 eV, the nitrogen concentration was integrated over the range of 397 eV to 402 eV, and the carbon concentration was integrated over the range of 280 eV to 293 eV. The proportion of the O1S peak with respect to the C1S peak area was evaluated as the amount of oxygen-containing functional groups (O1S/CIS), and the proportion of the N1S peak with respect to the C1S peak area was evaluated as the amount of nitrogen-containing functional groups (N1S/CIS). Furthermore, correction was made by the sensitivity correction coefficient of O of 2.93, and the sensitivity correction coefficient inherent to the apparatus. The evaluation results are presented in Table 3.

<Measurement of Rp-v, Ra and Rn of Single Fiber Surface that Constitutes Carbon Fiber Bundle>

Measurement was carried out under the following conditions for one single fiber of a carbon fiber bundle, and one image was obtained.

(Conditions for Scanning Probe Microscopic Analysis)

Apparatus: Nanosearch microscope LEXT OLS-3500 manufactured by Olympus Corp.

Mode: Contact mode

Probe: Cantilever OMCL-AC240TS-C2

Scanned region: 2 μm×2 μm

Scan angle: scanned in a perpendicular direction to the fiber axial direction

Scan rate: 1.0 Hz

Number of pixels: 268×268

Analysis environment: room temperature, in air

The image thus obtained was subjected to an image analysis under the following conditions using an image analysis software accessory to the scanning probe microscope.

(Image Analysis Conditions)

The shape images thus obtained were subjected to "gradient correction: curved surface fitting", and images in which curved surfaces were treated by fitting correction of converting curved surfaces to planar surfaces, were obtained. One of this is shown in FIG. 7. In FIG. 7, the vertical axis represents the height direction, and the horizontal axis represents the direction of scan (direction perpendicular to the fiber axis). From a surface roughness analysis of plane-corrected images, the average surface roughness (Ra), the maximum difference of elevation (P–V) in the plane, and the number of peaks (Rn) in the surface asperities per 2 μm were determined. Here, for the average surface roughness (Ra), the maximum difference of elevation (P–V) in the plane, and the number of peaks (Rn) in the surface asperities per 2 μm from the surface roughness analysis, data in a scanned region having a circumferential length of 2 μm×a length in the fiber axial direction 2 μm were used. Ra is to be calculated by the following formula.

$$Ra = \{1/(Lx \times Ly)\} \int_{Ly0} \int_{Lx0} |f(x,y)| dx dy$$

Central surface: a plane that bisects the actual surface into equal volumes, in parallel to the plane in which the difference of elevation with the actual surface is the minimum f(x,y): difference of elevation between the actual surface and the central surface Lx, Ly: size of XY-plane Furthermore, for the calculation of Rn, as described in FIG. 7, the site where an elevation of 2 μm or more occurred was regarded as one peak, and the number of such sites was counted.

Regarding the measurement, five filaments per sample were subjected to a shape analysis using a scanning probe microscope, and for the respective analytic images, values of the average surface roughness (Ra), the maximum difference of elevation (P–V), and the number of peaks of surface asperities per 2 μm (Rn) were determined, and the average values thereof were designated as the average surface roughness (Ra), the maximum difference of elevation (Rp–v), and the number of peaks of surface asperities per 2 μm (Rn). For the presence or absence of surface asperity structures extending for 2 μm or more in the longitudinal direction of the fiber at the surface of a single fiber, a region of 2 μm in the circumferential direction of the single fiber was repeatedly scanned in an AFM mode, over a span of 2 μm of the length in the fiber axial direction, while shifting little by little, and thus the presence or absence was determined from the analytic images thus obtained. The evaluation results are presented in Table 3.

<Measurement of Strand Strength and Strand Elastic Modulus of Carbon Fiber Bundle>

The strand properties (strand strength and strand elastic modulus) of a carbon fiber bundle were measured according to JIS R7601. The evaluation results are presented in Table 3.

<Measurement of Coefficient of Linear Expansion β of Resin>

The coefficient of linear expansion β of the resin was measured according to JIS K7197 using a thermomechanical analyzer (TMA) (manufactured by TA Instruments, Inc., product name: Q400). The evaluation results are presented in Table 4.

<Measurement of Resin Melting Point>

The amount of heat absorption and generation was measured using a DSC (manufactured by TA Instruments, Inc., product name: Q1000) under the measurement conditions of a nitrogen flow rate of 50 ml/min and a rate of temperature increase of 10° C./min, and a melting endothermic peak was recorded. This was designated as the melting point. The evaluation results are presented in Table 4.

<Measurement of Resin Viscosity>

Measurement was made using a rheometer (manufactured by TA Instruments, Inc., product name: AR-G2), at a frequency of 0.01 rad/sec to 10 rad/sec and a stress of 300 Pa, while shifting the measurement temperature by 2° C., and the temperature Tx at which the zero shear viscosity reached $2 \times 10^3$ Pa·s was recorded. The evaluation results are presented in Table 4.

Example 1

A carbon fiber prepreg and a carbon fiber composite material were produced using the PAN-based carbon fiber 1 (CF1) and the PMMA resin 1. Hereinafter, the procedure will be described specifically.

(Production of Resin Film)

First, about 2.5 g of resin pellets formed from the PMMA resin 1 were inserted between heating plates at 230° C. to 240° C. and thinly extended by pressing, using a two-stage hot and cold press (manufactured by Shinto Metal Industries Corp., product name: F-37). Thereafter, the resultant was cooled with cooling plates, and thereby a resin film formed from PMMA resin 1 and having a thickness of about 69 μm was produced. Regarding the thickness of the resin film thus produced, the thickness of the resin film was set up such that when a carbon fiber composite material was produced using a prepreg obtained by bonding the resin films thus produced onto both surfaces of a carbon fiber sheet that will be described below, and then completely impregnating the carbon fibers with these resin films, the percentage content of carbon fibers in this carbon fiber composite material would be 50% by volume.

(Production of Carbon Fiber Sheet and Carbon Fiber Thermoplastic Resin Prepreg)

PAN-based carbon fiber 1 was wound by drum winding, and thus a unidirectional carbon fiber sheet having a weight per area of carbon fibers (FAW: mass per unit area) of 248 g/m² was produced. Meanwhile, the PAN-based carbon fiber 1 was handled in the form of a fiber bundle (tow), and the number of strands of the PAN-based carbon fiber 1 that constituted each fiber bundle was 24,000.

Tension was appropriately applied to the carbon fiber sheet thus produced, and the resin film described above, a film formed of a fluororesin resin (manufactured by Nitto Denko Corp., trade name: NITOFLON FILM 970-4UL) and a flat plate made of aluminum were inserted in this order from both surfaces of the carbon fiber sheet. A semi-impregnated prepreg in which carbon fibers were oriented in a single direction (UD), under the conditions of 230° to 240° C., 5 minutes, and 20 kPa with the heating plates of the two-stage hot and cold press, and of 5 minutes and 20 kPa with the cooling plates. Here, the weight per area (TAW) of this prepreg was 432 g/m².

Molding of Unidirectional Carbon Fiber Composite Material Plate (7-ply)

The unidirectional prepreg thus obtained was cut patternwise to a size of 150 mm in length (length in the 0°-direction (direction parallel to the fiber axial direction of the carbon fiber))×150 mm in width (length in the 90°-direction (direction perpendicular to the fiber axial direction of the carbon fiber)). Subsequently, seven sheets of the patternwise-cut unidirectional prepreg were arranged in the 0°-direction and laminated (7-ply), the laminate was bagged, and then autoclave molding was carried out at a nitrogen pressure of 0.7 MPa under the conditions of temperature profile shown in FIG. 1. Thus, a unidirectional carbon fiber composite material plate having a thickness of about 2 mm was obtained.

(0° Bending Test)

The unidirectional carbon fiber composite material plate obtained as described above was cut to a dimension of 120 mm in length (length in the 0°-direction)×12.7 mm in width (length in the 90°-direction) using a wet type diamond cutter, and thus a specimen was produced. The specimen thus obtained was subjected to a three-point bending test by the method according to ASTM D790 (indenter R=5.0, L/D=40) using a universal testing machine (manufactured by Instron, Inc., product name: INSTRON 5565) and an analysis software (product name: BLUEHILL), and the 0°-flexural strength was calculated. The results are presented in Tables 1 and 2.

(90° Bending Test)

The unidirectional carbon fiber composite material plate obtained as described above was cut to a dimension of 60 mm in length (length in the 90°-direction)×12.7 mm in width (length in the 0°-direction) using a wet type diamond cutter, and thus a specimen was produced. The specimen thus obtained was subjected to a three-point bending test by the method according to ASTM D790 (indenter R=5.0, L/D=16) using a universal testing machine (manufactured by Instron, Inc., product name: INSTRON 5565) and an analysis software (product name: BLUEHILL), and the 90°-flexural strength was calculated. The results are presented in Tables 1 and 2.

(Measurement of Fiber Dispersity)

As shown in FIG. 4, in order to observe a cut surface (observed surface) 1a that was perpendicular to the fiber axial direction of the carbon fibers in the unidirectional carbon fiber composite material plate 1 obtained as described above, the circumference of the unidirectional carbon fiber composite material molded plate 1 was embedded in polyester resin 2 (manufactured by Heraeus-Kulzer, Inc., trade name: TECHNOVIT 4000) and polished, and thus an analytic sample was produced. Thereafter, from this analytic sample, an image of a cut surface 1a that was perpendicular to the fiber axial direction of the carbon fibers was taken using a digital microscope (manufactured by Keyence Corp., trade name: VHX-100). Then, the volume percentage content of the PAN-based carbon fiber (Vf) in the unidirectional carbon fiber composite material molded plate and the coefficient of fluctuation of this Vf were analyzed from the image of the cut surface 1a thus taken, using an image analysis software (manufactured by Keyence Corp., trade name: VH ANALYZER).

Specifically, first, as shown in FIG. 5, an arbitrary space (image analysis region 3) were selected from the image of the cut surface 1a thus taken. Then, this image analysis region 3 was divided into 30 parts each having an edge measuring 200 µm (10 points in the thickness direction and 3 points in the width direction of the unidirectional carbon fiber composite material plate). Meanwhile, this 200 µm corresponds to the length d of one edge of one compartment in the image analysis region 3 of FIG. 4. For these 30 compartments, the proportion of the area of a region of PAN-based carbon fiber portion included in the area of one compartment was calculated for each compartment as the volume percentage content of the PAN-based carbon fiber, and the coefficient of fluctuation (%) of the volume percentage content (Vf) of the PAN-based carbon fiber in these 30 compartments ([standard deviation/average value]×100) was calculated. As this coefficient of fluctuation is smaller, it can be said that the dispersed state (dispersity) of the carbon fibers in the unidirectional carbon fiber composite material plate is satisfactory.

Example 2

A carbon fiber prepreg and a unidirectional carbon fiber composite material plate were produced in the same manner as in Example 1, except that a PAN-based carbon fiber 2 (CF2) having an average single fiber fineness of 2.4 dtex was used as the PAN-based carbon fiber, and the number of single fibers that constituted the fiber bundle was changed to 12,000.

Comparative Example 1

A carbon fiber prepreg and a unidirectional carbon fiber composite material plate were produced in the same manner as in Example 1, except that a PAN-based carbon fiber 3 (CF3) having an average single fiber fineness of 0.67 dtex was used as the PAN-based carbon fiber, and the number of single fibers that constituted the fiber bundle was changed to 15,000.

Examples 3 to 4, and Comparative Example 2

Carbon fiber prepregs and unidirectional carbon fiber composite material plates were produced in the same manner as in Examples 1 and 2 and Comparative Example 1, respectively, except that the matrix resin was changed to PMMA resin 2.

Examples 5 and 6, and Comparative Example 3

Carbon fiber prepregs and unidirectional carbon fiber composite material plates were produced in the same manner as in Examples 1 and 2 and Comparative Example 1, respectively, except that the matrix resin was changed to AS resin 1, and the conditions for temperature profile at the time of producing the unidirectional carbon fiber composite material plate were changed to the conditions for temperature profile shown in FIG. 2.

Comparative Examples 4 to 6

Carbon fiber prepregs and unidirectional carbon fiber composite material plates were produced in the same manner as in Examples 1 and 2 and Comparative Example 1, respectively, except that the matrix resin was changed to AS resin 2, and the conditions for temperature profile at the time of producing the unidirectional carbon fiber composite material plate were changed to the conditions for temperature profile shown in FIG. 2.

Example 7 and Comparative Example 7

Carbon fiber prepregs and unidirectional carbon fiber composite material plates were produced in the same manner as in Example 1 and Comparative Example 1, respectively, except that the matrix resin was changed to PA12, and the conditions for temperature profile at the time of producing the unidirectional carbon fiber composite material plate were changed to the conditions for temperature profile shown in FIG. 3.

The properties of the PAN-based carbon fibers, thermoplastic resins, carbon fiber sheets, carbon fiber thermoplastic resin prepregs, and unidirectional carbon fiber composite material plates of the various Examples are presented in Tables 1 and 2.

TABLE 1

| | | | Example 1 | Example 2 | Comparative Example 1 | Example 3 | Example 4 | Comparative Example 2 |
|---|---|---|---|---|---|---|---|---|
| PAN-based carbon Fiber (PAN-based CF) | Kind | — | CF1 | CF2 | CF3 | CF1 | CF2 | CF3 |
| | Strand strength | MPa | 4218 | 3477 | 4900 | 4218 | 3477 | 4900 |
| | Strand elastic modulus | GPa | 236 | 230 | 240 | 236 | 230 | 240 |
| | Degree of circularity of single fiber | — | 0.82 | 0.83 | 0.99 | 0.82 | 0.83 | 0.99 |
| | Single fiber fineness | dtex | 1.2 | 2.4 | 0.67 | 1.2 | 2.4 | 0.67 |
| | Number of single fibers | fibers/tow | 24000 | 12000 | 15000 | 24000 | 12000 | 15000 |
| Thermoplastic resin | Kind | — | PMMA resin 1 | | | PMMA resin 2 | | |
| | Flexural modulus (FM) | MPa | 3300 | | | 3300 | | |
| | Flexural strength (FS) | MPa | 120 | | | 95 | | |
| | FM/FS | — | 28 | | | 35 | | |
| Carbon fiber sheet | Weight per area of carbon fiber (FAW) | g/m² | 248 | 252 | 250 | 248 | 252 | 250 |
| Carbon fiber prepreg | Weight per area of prepreg (TAW) | g/m² | 432 | 426 | 429 | 425 | 422 | 424 |
| | Percentage content of carbon fiber (Wf) | mass % | 57.5 | 59.1 | 58.3 | 58.4 | 59.7 | 59.1 |
| Carbon fiber composite material molded article | Volume percentage content of carbon fiber (Vf) | % | 45.7 | 46.9 | 42.8 | 47.5 | 48.3 | 45.1 |
| | 0°-flexural strength | MPa | 1003 | 1102 | 120 | 1348 | 1398 | 212 |
| | 90°-flexural strength | MPa | 80 | 78 | 38 | 81 | 72 | 43 |
| | Coefficient of fluctuations of Vf | % | 34 | 34 | 84 | 27 | 26 | 43 |

TABLE 2

| | | | Example 5 | Example 6 | Comparative Example 3 | Comparative Example 4 | Comparative Example 5 | Comparative Example 6 | Example 7 | Comparative Example 7 |
|---|---|---|---|---|---|---|---|---|---|---|
| PAN-based carbon fiber (PAN-based CF) | Kind | — | CF1 | CF2 | CF3 | CF1 | CF2 | CF3 | CF1 | CF3 |
| | Strand strength | MPa | 4218 | 3477 | 4900 | 4218 | 3477 | 4900 | 4218 | 4900 |
| | Strand elastic modulus | GPa | 236 | 230 | 240 | 236 | 230 | 240 | 236 | 240 |
| | Degree of circularity of single fiber | — | 0.82 | 0.83 | 0.99 | 0.82 | 0.83 | 0.99 | 0.82 | 0.99 |
| | Single fiber fineness | dtex | 1.2 | 2.4 | 0.67 | 1.2 | 2.4 | 0.67 | 1.2 | 0.67 |
| | Number of single fibers | fibers/tow | 24000 | 12000 | 15000 | 24000 | 12000 | 15000 | 24000 | 15000 |
| Thermoplastic resin | Kind | — | | AS resin 1 | | | AS resin 2 | | | PA12 resin |
| | Flexural modulus (FM) | MPa | | 3520 | | | 3460 | | | 1100 |
| | Flexural strength (FS) | MPa | | 108 | | | 69 | | | 47 |
| | FM/FS | — | | 33 | | | 50 | | | 23 |
| Carbon fiber sheet | Weight per area of Carbon fiber (FAW) | g/m² | 248 | 252 | 250 | 248 | 252 | 250 | 246 | 246 |
| Carbon fiber prepreg | Weight per area of prepreg (TAW) | g/m² | 406 | 402 | 404 | 409 | 409 | 407 | 398 | 398 |
| | Percentage content of carbon fiber (Wf) | mass % | 61.1 | 62.6 | 62.0 | 60.7 | 61.6 | 61.6 | 61.9 | 61.8 |
| Carbon fiber composite material molded article | Volume percentage content of carbon fiber (Vf) | % | 48.8 | 48.7 | 46.3 | 47.4 | 47.8 | 47.7 | 47.4 | 46.7 |
| | 0°-flexural strength | MPa | 912 | 908 | 230 | 907 | 998 | 956 | 1046 | 752 |
| | 90°-flexural strength | MPa | 80 | 61 | 44 | 18 | 15 | 18 | 83 | 47 |
| | Coefficient of fluctuations of Vf | % | 31 | 16 | 35 | 20 | 15 | 24 | 25 | 42 |

In both Examples 1 and 2, the coefficient of fluctuations of Vf measured by an image analysis was smaller, compared to Comparative Example 1 in which the single fiber fineness did not satisfy the requirement of the present invention. Therefore, the dispersed state (dispersity) of the carbon fibers was satisfactory, and since the 0°-flexural strength and the 90°-flexural strength were high, the mechanical properties were also satisfactory.

In both Examples 3 and 4, the coefficient of fluctuations of Vf measured by an image analysis was smaller, compared to Comparative Example 2 in which the single fiber fineness did not satisfy the requirement of the present invention. Therefore, the dispersed state (dispersity) of the carbon fibers was satisfactory, and since the 0°-flexural strength and the 90°-flexural strength were high, the mechanical properties were also satisfactory.

In both Examples 5 and 6, the coefficient of fluctuations of Vf measured by an image analysis was smaller, compared to Comparative Example 3 in which the single fiber fineness did not satisfy the requirement of the present invention. Therefore, the dispersed state (dispersity) of the carbon fibers was satisfactory, and since the 0°-flexural strength and the 90°-flexural strength were high, the mechanical properties were also satisfactory.

Comparative Examples 4 to 6 were intended to compare the 0°-flexural strength and the coefficient of fluctuations of Vf in the carbon fiber composite materials in the case in which Formula (1) was not satisfied, that is, a thermoplastic resin having inferior mechanical characteristics (AS resin 2) was used. As a result, in Comparative Examples 4 and 5 that satisfied the requirement of single fiber fineness according to the present invention, the 0°-flexural strength values were equivalent to Comparative Example 6 that did not satisfy these requirements; however, the coefficients of fluctuations of Vf measured by an image analysis were smaller compared with Comparative Example 6. Thus, the dispersed state (dispersity) of the carbon fibers was improved. However, the thermoplastic resin used in Comparative Examples 4 to 6 did not satisfy Formula (1) as described above, and exhibited lower 90°-flexural strength and lower flexural strength (FS) of the resin. From these, there is a high possibility that when impact is applied to the composite material, delamination of the prepreg may occur, and the impact resistance performance such as energy absorption performance may be insufficient.

In Example 7, the coefficient of fluctuations of Vf measured by an image analysis was smaller, compared with Comparative Example 7 in which the single fiber fineness did not satisfy the requirement of the present invention. Therefore, the dispersed state (dispersity) of the carbon fibers was satisfactory, and since the 0°-flexural strength and the 90°-flexural strength were high, the mechanical properties were also satisfactory.

From the above results, the carbon fiber prepreg of the present invention produced by impregnating a PAN-based carbon fiber having an average single fiber fineness of 1.0 dtex to 2.4 dtex with a thermoplastic resin having a ratio (FM/FS) of the flexural modulus FM (MPa) and the flexural strength FS (MPa) of 20 to 40, may have a satisfactory fiber dispersed state (dispersity) in a prepreg or in a carbon fiber composite material molded article using this prepreg, and may also have superior mechanical characteristics (for example, 0°-flexural strength and impact resistance).

Production Method 1 for Carbon Fiber Thermoplastic Resin Prepregs of Examples 8 to 10 and Comparative Examples 8 and 9

A resin film having a thickness of 40 μm was obtained from the raw material modified polypropylene using a single-screw extruder (manufactured by IKG Corp., product name: PMS30).

A carbon fiber sheet having a carbon fiber weight per area of 145 g/m² was produced by a drum winding method, subsequently tension was appropriately applied to this carbon fiber sheet, and the resin film, a film formed from a fluororesin (manufactured by Nitto Denko Corp., trade name: NITOFLON FILM 970-4UL) and a flat plate made of aluminum were inserted in this order from both surfaces of the carbon fiber sheet. A carbon fiber thermoplastic resin prepreg having a fiber volume percentage content of about 50% by volume was obtained under the conditions of 230° C., 5 minutes, and 20 kPa with the heating plates of a two-stage hot and cold press, and of 5 minutes and 30 kPa with the cooling plates.

Production Method 2 for Carbon Fiber Thermoplastic Resin Prepregs of Examples 11 and 12 and Comparative Example 10

Carbon fiber thermoplastic resin prepregs having a fiber volume percentage content of about 50% by volume were obtained in the same manner as in the production method 1 for a carbon fiber thermoplastic resin prepreg, except that the raw material modified polypropylene was changed to polyamide 6, and the conditions of the heating plates of the two-stage hot and cold press were changed to 260° C. and 10 minutes.

Production Method 3 for Carbon Fiber Thermoplastic Resin Prepregs of Example 13 and Comparative Example 11

Carbon fiber thermoplastic resin prepregs having a fiber volume percentage content of about 40% by volume were obtained in the same manner as in the production method 2 for a carbon fiber thermoplastic resin prepreg, except that the raw material polyamide 6 was changed to polyamide 610, the film thickness was changed to 47 μm, and the carbon fiber weight per area was changed to 115 g/m².

Production Method 4 for Carbon Fiber Thermoplastic Resin Prepregs of Example 14 and Comparative Example 12>

Carbon fiber thermoplastic resin prepregs having a fiber volume percentage content of about 43% by volume were obtained in the same manner as in the production method 2 for a carbon fiber thermoplastic resin prepreg, except that the raw material polyamide 6 was changed to polycarbonate, the film thickness was changed to 36 μm, and the carbon fiber weight per area was changed to 97 g/m².

<Measurement of Fiber Volume Percentage Content Vf of Carbon Fiber Thermoplastic Resin Prepreg>

Each of the carbon fiber thermoplastic resin prepregs of Examples 8 to 14 and Comparative Examples 8 to 12 obtained by the production methods 1 to 4 for a carbon fiber thermoplastic resin prepreg, was cut to an appropriate size, and the fiber volume percentage content Vf of the carbon fiber thermoplastic resin prepreg was measured according to JIS K7075. The evaluation results are presented in Tables 5 and 6.

Meanwhile, the flexural modulus and flexural strength of the thermoplastic resin are values determined by sufficiently drying the thermoplastic resin to be analyzed, and analyzing a specimen molded by injection molding, by the testing method according to ISO178 at a temperature of 23±2° C.

<Production Method 1 for Carbon Fiber Composite Material Plate>

The carbon fiber thermoplastic resin prepreg obtained by the production method 1 for a carbon fiber thermoplastic resin prepreg was cut to an appropriate size, and six sheets of the prepreg were stacked such that the fiber direction was $[0°]_6=0°/0°/0°/0°/0°/0°$, and bagged. Subsequently, the assembly was molded in an autoclave under the conditions of 230° C.×15 minutes, a rate of temperature increase of 4° C./min, a pressure of 0.7 MPa, and an in-bag pressure of −100 kPa. Thus, a carbon fiber composite material plate having a thickness of 1 mm was obtained.

<Production Method 2 for Carbon Fiber Composite Material Plate>

The carbon fiber thermoplastic resin prepreg obtained by the production method 2 for a carbon fiber thermoplastic resin prepreg was cut to an appropriate size, and six sheets of the prepreg were stacked such that the fiber direction was $[0°]_6=0°/0°/0°/0°/0°/0°$, and bagged. Subsequently, the assembly was molded in an autoclave under the conditions of 300° C.×30 minutes, a rate of temperature increase of 4° C./min, a pressure of 0.7 MPa, and an in-bag pressure of −100 kPa. Thus, a carbon fiber composite material plate having a thickness of 1 mm was obtained.

<Production Method 3 for Carbon Fiber Composite Material Plate>

The carbon fiber thermoplastic resin prepreg obtained by the production method 3 for a carbon fiber thermoplastic resin prepreg was cut to an appropriate size, and eight sheets of the prepreg were stacked such that the fiber direction was $[0°]_{18}=0°/0°/0°/0°/0°/0°/0°/0°$, and bagged. Subsequently, the assembly was molded in an autoclave under the conditions of 300° C.×30 minutes, a rate of temperature increase of 4° C./min, a pressure of 0.7 MPa, and an in-bag pressure of −100 kPa. Thus, a carbon fiber composite material plate having a thickness of 1 mm was obtained.

<Production Method 4 for Carbon Fiber Composite Material Plate>

The carbon fiber thermoplastic resin prepreg obtained by the production method 4 for a carbon fiber thermoplastic resin prepreg was cut to an appropriate size, and nine sheets of the prepreg were stacked such that the fiber direction was $[0°]_9=0°/0°/0°/0°/0°/0°/0°/0°/0°$, and bagged. Subsequently, the assembly was molded in an autoclave under the conditions of 300° C.×30 minutes, a rate of temperature increase of 4° C./min, a pressure of 0.7 MPa, and an in-bag pressure of −100 kPa. Thus, a carbon fiber composite material plate having a thickness of 1 mm was obtained.

<Measurement of Thermoplastic Resin Volume Percentage Content of Carbon Fiber-Reinforced Composite Material>

Each of the carbon fiber composite material plates obtained by the production methods 1 to 4 for a carbon fiber composite material plate was cut to a specimen measuring 3 cm on each side, and the thermoplastic resin volume percentage content Vr was measured according to JIS K7075. The evaluation results are presented in Tables 5 and 6.

<Measurement of St, Sa, Tt and Tf of Cross-Section of Carbon Fiber-Reinforced Composite Material>

(Sample Production)

Each of the carbon fiber composite material plates obtained by the production methods 1 to 4 for a carbon fiber composite material plate was cut to a specimen measuring 3 cm on each side, and the specimen was embedded in TECHNOVIT 4000 manufactured by Heraeus-Kulzer, Inc. After TECHNOVIT 4000 was cured, the specimen was subjected to a mirror surface treatment.

(Microscopic Observation)

An image of the embedded sample was taken under the conditions described below, and one image was obtained.

Apparatus: Digital microscope VHX-100 manufactured by Keyence Corp.

Lens magnification: 150 times

Number of pixels: 1600×1200

Interval of points: 1.3 µm (Image Processing)

For the image thus obtained, in a region of (thickness)× (width of 1 mm in a direction perpendicular to the thickness direction) (that is, when the thickness was X mm, a region having an area of X mm$^2$), a non-reinforcing fiber-containing region of the image thus obtained was binarized at a color tolerance of 5 by "Color extraction" using a software: digital image analysis software VH-H1A5 manufactured by Keyence Corp., and optionally, the non-reinforcing fiber-containing region was displayed in white, and a fiber-reinforced region was displayed in black by "Negative/positive inversion". A non-reinforcing fiber-containing region having an area of 120 pixels or less was removed by "Small particle removal".

(Measurement)

The areas of all the non-reinforcing fiber-containing layers were determined by "Area measurement" using a digital image analysis software (manufactured by Keyence Corp., product name: VH-H1A5), and the sum of the areas was recorded as St, while the entirety of the observed area of (thickness)×width of 1 mm was recorded as Sa. Furthermore, the thicknesses of all the non-reinforcing fiber-containing layers and fiber-reinforced layers were measured at an interval of 50 µm in the width direction by "Main measurement (between two points)", and the maximum value of the thickness of the non-reinforcing fiber-containing layer was recorded as max(Tt), while the average value of the thicknesses of the fiber-reinforced layers was recorded as Ave(Tf). The evaluation results are presented in Tables 5 and 6.

<Compression Test for Carbon Fiber Composite Material Plate>

A tab produced from the same material as that of the carbon fiber composite material plate described above was adhered to each of the carbon fiber composite material plates obtained by the production methods 1 to 4 for a carbon fiber composite material plate, and then a specimen was produced by cutting the resultant to a dimension of a length (0° direction) of 80 mm and a width of 12.7 mm using a wet type diamond cutter. The specimen thus obtained was dried for 48 hours in a desiccators and was conditioned for 96 hours in an environment at 23±1° C. and 50±2% RH, and then a 0° compression test was carried out according to SACMA-94 using a universal testing machine (manufactured by Instron, Inc., product name: INSTRON 5882) and an analysis software (product name: BLUEHILL). Thus, the 0° compressive strength and the elastic modulus were calculated as values in terms of Vf of the carbon fiber thermoplastic resin prepreg used. The evaluation results are presented in Tables 5 and 6.

Example 8

A carbon fiber composite material plate was produced according to the production method 1 for a carbon fiber thermoplastic resin prepreg and the production method 1 for a carbon fiber composite material plate, using the CF4 and the modified polypropylene, and the properties were evaluated.

Comparative Example 8

A carbon fiber composite material plate was produced in the same manner as in Example 8, except that CF9 was used instead of the CF4, and the properties were evaluated. When the compressive strength of the carbon fiber composite material obtained in Comparative Example 8 was compared with that of Example 8, a lower value was obtained.

Example 9

A carbon fiber composite material plate was produced in the same manner as in Example 8, except that CF5 was used instead of the CF4, and the properties were evaluated.

Example 3

A carbon fiber composite material plate was produced in the same manner as in Example 8, except that CF6 was used instead of the CF4, and the properties were evaluated.

Comparative Example 9

A carbon fiber composite material plate was produced in the same manner as in Example 8, except that CF10 was used instead of the CF4, and the properties were evaluated. When the compressive strength of the carbon fiber composite material obtained in Comparative Example 9 was compared with those of Examples 9 and 10, a lower value was obtained.

Example 11

A carbon fiber composite material plate was produced according to the production method 2 for a carbon fiber thermoplastic resin prepreg and the production method 2 for a carbon fiber composite material plate, using the CF5 and the polyamide 6, and the properties were evaluated.

Example 12

A carbon fiber composite material plate was produced in the same manner as in Example 11, except that CF6 was used instead of the CF5, and the properties were evaluated.

Comparative Example 10

A carbon fiber composite material plate was produced in the same manner as in Example 11, except that CF10 was used instead of the CF5, and the properties were evaluated. When the compressive strength of the carbon fiber composite material obtained in Comparative Example 10 was compared with the values of Examples 11 and 12, a lower value was obtained.

Example 13

A carbon fiber composite material plate was produced according to the production method 3 for a carbon fiber thermoplastic resin prepreg and the production method 3 for a carbon fiber composite material plate, using the CF4 and the polyamide 610, and the properties were evaluated.

Comparative Example 11

A carbon fiber composite material plate was produced in the same manner as in Example 13, except that CF9 was used instead of the CF4, and the properties were evaluated. When the compressive strength of the carbon fiber composite material obtained in Comparative Example 11 was compared with that of Example 13, a lower value was obtained.

Example 14

A carbon fiber composite material plate was produced according to the production method 4 for a carbon fiber thermoplastic resin prepreg and the production method 4 for a carbon fiber composite material plate, using the CF4 and the polycarbonate, and the properties were evaluated.

Comparative Example 12

A carbon fiber composite material plate was produced in the same manner as in Example 14, except that CF9 was used instead of the CF4, and the properties were evaluated. When the compressive strength of the carbon fiber composite material obtained in Comparative Example 12 was compared with that of Example 14, a lower value was obtained.

Comparative Example 13

55 parts by mass of a liquid bisphenol A type epoxy resin (manufactured by Mitsubishi Chemical Corp., product name: jER828), 45 parts by mass of an oxazolidone type epoxy resin (manufactured by Asahi Kasei E-Materials Corp., product name: AER4152), and 2 parts by mass of a polyvinylformal resin (manufactured by Chisso Corp., product name: VINYLEC E) were weighed in a container, and the mixture was heated to 160° C. using an oil bath and mixed in a molten state. The temperature was lowered to 60° C., and 1.33 parts by mass of dichlorophenyldimethylurea (manufactured by Hodogaya Chemical Co., Ltd., product name: DCMU99) and 5.33 parts by mass of dicyandiamide (manufactured by Mitsubishi Chemical Corp., product name: DICY15) were added thereto and kneaded. Thus, an epoxy resin composition was obtained. The epoxy resin composition thus obtained was produced into a film form, using a comma coater (manufactured by Hirano Tecseed Co., Ltd., product name: M-500), and thus a resin film (hot melt film) having a resin weight per area of 50 g/m$^2$ was obtained. This resin film was laminated on both surfaces of the PAN-based carbon fiber 7 that had been aligned by a drum winding method, and the PAN-based carbon fiber 7 was impregnated with the films using a heating roll. Thus a carbon fiber prepreg having a fiber weight per area of 200 g/m$^2$ and a resin percentage content of 32% by mass was obtained. The carbon fiber prepreg thus obtained was cut to an appropriate size, six sheets of the prepreg were stacked such that the fiber direction would be $[0°]_6$=0°/0°/0°/0°/0°/0°, and bagged. Subsequently, the assembly was cured and molded in an oven under the conditions of 90° C.×120 minutes, a rate of temperature profile of 0.5° C./min, and an in-bag pressure of −100 kPa, and thus a carbon fiber composite material plate having a thickness of 2 mm was obtained. A tab produced from the same material as the carbon fiber composite material plate thus obtained was adhered thereto, and then the resultant was cut to a dimension of a length (0° direction) of 80 mm and a width of 12.7 mm using a wet diamond cutter. Thus, a specimen was produced. The specimen thus obtained was subjected to a 0° compression test according to SACMA-94 using a universal testing machine (manufactured by Instron, Inc., product name: INSTRON 5882) and an analysis software (product name: BLUEHILL), and the 0° compressive strength and the elastic modulus were calculated as values relative to a Vf of 56 vol %. The evaluation results are presented in Table 7.

Comparative Example 14

A carbon fiber composite material plate was produced in the same manner as in Comparative Example 13, except that CF7 was used instead of CF10, and the properties were evaluated. The evaluation results are presented in Table 7.

Comparative Example 15

A carbon fiber composite material plate was produced in the same manner as in Comparative Example 13, except that CF8 was used instead of CF10, and the properties were evaluated. The evaluation results are presented in Table 7.

The compressive strength of the carbon fiber composite materials obtained in Comparative Examples 13 to 15 was not involved with the average single fiber fineness of the carbon fiber bundle, and no change was observed.

TABLE 3

| | Carbon fiber bundle | CF4 | CF5 | CF6 | CF7 | CF8 | CF9 | CF10 | CF11 |
|---|---|---|---|---|---|---|---|---|---|
| Single fiber shape and cut surface | Average single fiber fineness [dtex] | 1.4 | 1.4 | 2.4 | 1.2 | 2.0 | 0.7 | 0.7 | 0.7 |
| | Degree of circularity | 0.82 | 0.82 | 0.83 | 0.75 | 0.83 | 0.95 | 0.95 | 0.99 |
| | Maximum Feret's diameter [μm] | 12.8 | 12.8 | 16.4 | 11.9 | 15.6 | 7.5 | 7.5 | 7.0 |
| | Minimum Feret's diameter [μm] | 7.7 | 7.7 | 9.1 | 7.5 | 8.7 | 6.4 | 6.4 | 7.0 |
| | Minimum Feret's diameter/ maximum Feret's diameter | 0.60 | 0.60 | 0.55 | 0.63 | 0.56 | 0.85 | 0.85 | 1.0 |
| | Presence or absence of striped pattern of light and dark in cut surface | No stripes | No stripes | No stripes | No stripes | No stripes | No data | No data | Striped |
| Number of filaments | [strands] | 24000 | 28000 | 12000 | 28000 | 12000 | 15000 | 12000 | 12000 |
| Surface treatment | iPa value [μA/cm2] | 0.1 | 0.1 | 0.1 | 0.1 | 0.1 | 0.4 | 0.4 | No data |
| | O1S/C1S | 0.05 | 0.05 | 0.05 | 0.05 | 0.05 | 0.15 | 0.15 | No data |
| | N1S/C1S | 0.06 | 0.06 | 0.06 | 0.06 | 0.06 | 0.03 | 0.03 | No data |
| Sizing agent | Kind of sizing agent | | | | Epoxy resin | | | | |
| | Amount of attachment of sizing agent [wt %] | 0.4 | 1.2 | 1.2 | 1.2 | 1.2 | 0.4 | 1.2 | 1.0 |

TABLE 3-continued

| Carbon fiber bundle | | CF4 | CF5 | CF6 | CF7 | CF8 | CF9 | CF10 | CF11 |
|---|---|---|---|---|---|---|---|---|---|
| Surface asperities | Difference of elevation of single fiber surface asperities Rp-v [nm] | 80 | 80 | 80 | 75 | 60 | 130 | 130 | 25 |
| | Degree of single fiber surface asperities Ra [nm] | 20 | 20 | 15 | 19 | 15 | 22 | 22 | 3 |
| | Number of peaks of surface asperities per 2 μm of single fiber surface Rn [/2 μm] | 13 | 13 | 14 | 15 | 13 | 5 | 5 | 1 |
| Strand properties | Strand strength [MPa] | 4275 | 4055 | 3600 | 4215 | 3480 | 4900 | 4900 | 4900 |
| | Strand elastic modulus [GPa] | 230 | 230 | 230 | 230 | 245 | 240 | 240 | 230 |

TABLE 4

| Thermoplastic resin | Modified polypropylene | Polyamide 6 | Polyamide 610 | Polycarbonate |
|---|---|---|---|---|
| Coefficient of linear expansion β [/° C.] | $1.1 \times 10^{-6}$ | $8.0 \times 10^{-5}$ | $1.2 \times 10^{-6}$ | $7.0 \times 10^{-5}$ |
| Lower limit temperature for molding Melting point [° C.] Tx [° C.] | 165 | 220 | 215 | — |
| Tc [° C.] | — | — | — | 215 |

TABLE 5

| | | Example 8 | Comparative Example 8 | Example 9 | Example 10 | Comparative Example 9 |
|---|---|---|---|---|---|---|
| Carbon fiber bundle | | CF4 | CF9 | CF5 | CF6 | CF10 |
| Thermoplastic resin | | Modified polypropylene | | | | |
| Carbon fiber thermoplastic resin prepreg | Vf [vol %] | 50 | | | | |
| | Value of Formula (2) | 0.77 | | | | |
| Carbon fiber composite material | Vr [vol %] | 46 | 46 | 50 | 50 | 50 |
| | St [mm²] | 0.71 | 1.78 | 1.94 | 1.83 | 3.44 |
| | Sa [mm²] | 8.93 | 8.90 | 9.69 | 10.14 | 9.84 |
| | max(Tt) [μm] | 75 | 125 | 105 | 90 | 160 |
| | ave(Tf) [μm] | 125 | 105 | 105 | 115 | 90 |
| | Value of Formula (3) | 0.17 | 0.43 | 0.40 | 0.36 | 0.70 |
| | Value of Formula (4) | 0.60 | 1.19 | 1.00 | 0.78 | 1.78 |
| | 0° compression test Strength [MPa] | 699 | 624 | 510 | 704 | 499 |
| | Elastic modulus [GPa] | 102 | 100 | 101 | 108 | 105 |

TABLE 6

| | | Example 11 | Example 12 | Comparative Example 10 | Example 13 | Comparative Example 11 | Example 14 | Comparative Example 12 |
|---|---|---|---|---|---|---|---|---|
| Carbon fiber bundle | | CF5 | CF6 | CF10 | CF4 | CF9 | CF4 | CF9 |
| Thermoplastic resin | | Polyamide 6 | | | Polyamide 610 | | Polycarbonate | |
| Carbon fiber thermoplastic resin prepreg | Vf [vol %] | 50 | | | 40 | | 43 | |
| | Value of Formula (2) | 0.78 | | | 1.37 | | 0.89 | |
| Carbon fiber composite material | Vr [vol %] | 50 | 50 | 50 | 58 | 60 | 62 | 56 |
| | St [mm²] | 0.39 | Data not available | 2.96 | 0.98 | 1.49 | 1.72 | 1.64 |
| | Sa [mm²] | 9.70 | Data not available | 9.88 | 12.20 | 12.41 | 11.47 | 10.94 |
| | max(Tt) [μm] | 25 | Data not available | 145 | 90 | 150 | 75 | 95 |
| | ave(Tf) [μm] | 310 | Data not available | 90 | 155 | 100 | 105 | 75 |
| | Value of Formula (3) | 0.08 | Data not available | 0.60 | 0.14 | 0.20 | 0.24 | 0.27 |
| | Value of Formula (4) | 0.08 | Data not available | 1.61 | 0.58 | 1.50 | 0.71 | 1.27 |
| | 0° compression test Strength [MPa] | 803 | 852 | 659 | 821 | 714 | 861 | 681 |

TABLE 6-continued

|  |  | Example 11 | Example 12 | Comparative Example 10 | Example 13 | Comparative Example 11 | Example 14 | Comparative Example 12 |
|---|---|---|---|---|---|---|---|---|
|  | Elastic modulus [GPa] | 109 | 108 | 107 | 85 | 89 | 92 | 92 |

TABLE 7

|  |  |  | Comparative Example 13 | Comparative Example 14 | Comparative Example 15 |
|---|---|---|---|---|---|
| Carbon fiber bundle |  |  | CF7 | CF8 | CF10 |
| Resin |  |  | Epoxy resin (thermosetting) | | |
| Prepreg | Vf [vol %] |  | 56 | | |
| Carbon fiber composite material | 0° compression test | Strength [MPa] | 1424 | 1420 | 1430 |
|  |  | Elastic modulus [GPa] | 118 | 119 | 118 |

INDUSTRIAL APPLICABILITY

According to the present invention, there are provided a carbon fiber thermoplastic resin prepreg that gives a carbon fiber composite material in which, even in a case in which a thermoplastic resin having excellent mechanical characteristics, such as polymethyl methacrylate (PMMA), an acrylonitrile-styrene copolymer resin (AS resin), or polyamide 12 (PA12), is used as the matrix resin, carbon fibers are uniformly dispersed, and the material exhibits high flexural strength; a method for producing the carbon fiber thermoplastic resin prepreg; and a carbon fiber composite material using the prepreg. Furthermore, according to the present invention, there can be provided a carbon fiber thermoplastic resin prepreg from which a carbon fiber-reinforced composite material that exhibits excellent impact resistance and a shorter molding time, with less micromeandering of the fibers; and a carbon fiber-reinforced composite material and an automobile part obtainable by using the carbon fiber thermoplastic resin prepreg.

EXPLANATIONS OF LETTERS OR NUMERALS

1 Unidirectional carbon fiber composite material molded plate
1a Cut surface (observed surface) perpendicular to fiber axial direction
2 Polyester resin
3 Image analysis region
d Length of one edge of one compartment

The invention claimed is:
1. A carbon fiber thermoplastic resin prepreg obtained by a process comprising: impregnating a carbon fiber bundle of plural carbon fibers having an average single fiber fineness of from 1.1 dtex to 2.4 dtex with a thermoplastic resin composition, wherein a single fiber of the carbon fiber in the carbon fiber bundle has plural surface asperity structures extending over 2 μm or more in the fiber longitudinal direction, and the difference of elevation between the peak and the bottom (Rp−v) in a region having a circumferential length of the single fiber of 2000 nm×a length in the fiber axial direction of 2000 nm is in the range of 60 nm to 200 nm.

2. The carbon fiber thermoplastic resin prepreg according to claim 1, wherein the thermoplastic resin composition is a thermoplastic resin that satisfies Formula (1):

$$20 \leq (FM/FS) \leq 40 \quad (1)$$

where,
FM represents a flexural modulus (MPa) of a resin plate formed from the thermoplastic resin composition only; and
FS represents a flexural strength (MPa) of the resin plate.

3. The carbon fiber thermoplastic resin prepreg according to claim 1, wherein the thermoplastic resin composition is a thermoplastic resin composition that satisfies Formula (2):

$$25 \leq (FM/FS) \leq 35 \quad (2)$$

where,
FM represents a flexural modulus (MPa) of a resin plate formed from the thermoplastic resin composition only; and
FS represents a flexural strength (MPa) of the resin plate.

4. The carbon fiber thermoplastic resin prepreg according to claim 1, wherein the carbon fiber bundle is a PAN-based carbon fiber bundle.

5. A carbon fiber composite material formed from the carbon fiber thermoplastic resin prepreg according to claim 1.

6. The carbon fiber thermoplastic resin prepreg according to claim 1, wherein a degree of circularity of a single fiber of the carbon fibers in the carbon fiber bundle is from 0.70 to 0.90, provided that the degree of circularity is determined by Formula (4):

$$\text{Degree of circularity} = 4\pi S/L^2 \quad (4)$$

where
S represents an area of a cross-section of the single fiber; and
L represents a circumferential length of the cross-section of the single fiber.

7. The carbon fiber thermoplastic resin prepreg according to claim 6, satisfying Formula (5):

$$\beta \times (Tc-25) \times (100-Vf) > 0.5 \quad (5)$$

where

β represents a coefficient of linear expansion (1/° C.) of the thermoplastic resin composition;

Tc represents a lower limit temperature for molding (° C.) of the thermoplastic resin composition, when the thermoplastic resin composition has a melting point, the lower limit temperature for molding is the melting point of the composition, and when the thermoplastic resin composition does not have a melting point, the lower limit temperature for molding is a temperature at which the composition has a viscosity of $1 \times 10^4$ Pa·s; and Vf represents a fiber volume percentage content (% by volume) of the carbon fiber thermoplastic resin prepreg.

8. The carbon fiber thermoplastic resin prepreg according to claim 6, wherein the thermoplastic resin composition is at least one selected from the group consisting of a polypropylene resin, a polyamide resin, a modified resin of a polypropylene resin, and a modified resin of a polyamide resin.

9. A carbon fiber thermoplastic resin prepreg flake, obtained by using the carbon fiber thermoplastic resin prepreg according to claim 6.

10. A carbon fiber-reinforced composite material, obtained by using the carbon fiber thermoplastic resin prepreg flake according to claim 9.

11. A carbon fiber-reinforced composite material, obtained by using the carbon fiber thermoplastic resin prepreg according to claim 6.

12. An automobile part, obtained by using the carbon fiber-reinforced composite material according to claim 11.

13. A method for producing a carbon fiber thermoplastic resin prepreg, the method comprising: impregnating a PAN-based carbon fiber bundle having an average single fiber fineness of from 1.1 dtex to 2.4 dtex with a thermoplastic resin composition, thereby obtaining the carbon fiber thermoplastic resin prepreg, wherein the thermoplastic resin composition is a thermoplastic resin composition that satisfies Formula (3):

$$20 \leq (FM/FS) \leq 40 \qquad (3)$$

where, FM represents a flexural modulus (MPa) of a resin plate formed from the thermoplastic resin composition only; and FS represents a flexural strength (MPa) of the resin plate, and a single fiber of the carbon fiber in the carbon fiber bundle has plural surface asperity structures extending over 2 μm or more in the fiber longitudinal direction, and the difference of elevation between the peak and the bottom (Rp–v) in a region having a circumferential length of the single fiber of 2000 nm×a length in the fiber axial direction of 2000 nm is in the range of 60 nm to 200 nm.

14. The method according to claim 13, wherein the thermoplastic resin composition is a film.

* * * * *

UNITED STATES PATENT AND TRADEMARK OFFICE
CERTIFICATE OF CORRECTION

PATENT NO. : 10,370,506 B2
APPLICATION NO. : 14/387008
DATED : August 6, 2019
INVENTOR(S) : Masao Tomioka et al.

Page 1 of 1

It is certified that error appears in the above-identified patent and that said Letters Patent is hereby corrected as shown below:

On the Title Page

Item (30), the Foreign Application Priority Data is incorrect. Item (30) should read:
-- (30) Foreign Application Priority Data
Mar. 29, 2012   (JP).....................2012-075986
Apr. 17, 2012   (JP)......................2012-093950 --

Signed and Sealed this
Twelfth Day of November, 2019

Andrei Iancu
*Director of the United States Patent and Trademark Office*